United States Patent [19]

Schaffer et al.

[11] Patent Number: 5,070,995

[45] Date of Patent: Dec. 10, 1991

[54] NONCONTACT CONVEYOR FEEDER SYSTEM

[75] Inventors: Eric J. Schaffer, Eden Prairie; David J. Hanson, Apple Valley, both of Minn.

[73] Assignee: MTS Systems Corporation, Eden Prairie, Minn.

[21] Appl. No.: 555,777

[22] Filed: Jul. 19, 1990

Related U.S. Application Data

[63] Continuation of Ser. No. 242,748, Sep. 8, 1988, abandoned.

[51] Int. Cl.$^5$ ............................................. B65G 47/31
[52] U.S. Cl. ...................................... 198/460; 198/461; 198/572
[58] Field of Search ............... 198/460, 358, 461, 357, 198/464.2, 572

[56] References Cited

U.S. PATENT DOCUMENTS

| | | | |
|---|---|---|---|
| 3,335,841 | 8/1967 | Klingel et al. | 198/460 |
| 3,485,339 | 12/1969 | Miller et al. | 198/460 |
| 3,871,511 | 3/1975 | Wentz et al. | 198/358 |
| 4,135,346 | 1/1979 | Rebsamen | 198/341 X |
| 4,172,347 | 10/1979 | Nitz . | |
| 4,197,935 | 4/1980 | Aterianus et al. | 198/460 |
| 4,355,712 | 10/1982 | Bruno | 198/460 |
| 4,514,963 | 5/1985 | Bruno | 198/460 X |
| 4,604,704 | 8/1986 | Eaves et al. | 198/460 X |
| 4,629,058 | 12/1986 | Reissmann et al. | 198/461 |
| 4,640,408 | 2/1987 | Eaves | 198/460 |
| 4,653,630 | 3/1987 | Bravin | 198/460 |

FOREIGN PATENT DOCUMENTS 0153016 7/1987 Japan ............................ 198/460

Primary Examiner—Robert P. Olszewski
Assistant Examiner—James R. Bidwell
Attorney, Agent, or Firm—Kinney & Lange

[57] ABSTRACT

A feeder conveyor system for transferring randomly spaced products received from an input conveyor to precise locations within flites of a wrapper conveyor. A plurality of conveyors, prior to the wrapper conveyor, are independently driven by product positioning drive subsystems. Each product positioning drive subsystem associates products on its respective conveyor with target flites on the wrapper conveyor, and characterizes positional errors of the products on the conveyor relative to their associated target flites as being in one of a plurality of discrete positional error states representing a range of errors. The velocity of the conveyors controlled by the positioning drive subsystem as a function of the positional error state and the fill state of the associated target flite and flite previous to the target flite. A plurality of spacing conveyors are positioned upstream from the positioning conveyors and are independently driven by products spacing drive subsystems. The velocity of the spacing conveyors is controlled by the spacing drive subsystems as a function of state flags to space products at flite lengths with respect to one another. Overall operation of the positioning drive subsystems and spacing drive subsystems is controlled by a system processor.

19 Claims, 7 Drawing Sheets

| Subsystem State | Flags | | | | | |
|---|---|---|---|---|---|---|
| 1 | INITF = 0<br>ENABLF = 0<br>MOVEF = 0<br>CALCF = 0<br>FASTF = 0<br>BUFFER = 0 | | | | | |
| 2 | INITF = 1<br>ENABLF = 0<br>MOVEF = 0<br>CALCF = 0<br>FASTF = 0<br>BUFFER = 1 | | | | | |
| 3 | INITF = 1<br>ENABLF = 0<br>MOVEF = 0  MOVEF = 2<br>CALCF = 1  CALCF = 0<br>FASTF = 0<br>BUFFER = 2 | | | | | |
| 4 | INITF = 1<br>ENABLF = 0<br>MOVEF = 2<br>CALCF = 1<br>FASTF = 0<br>BUFFER = 3 | | | | | |
| 5 | INITF = 1<br>ENABLF = 0<br>MOVEF = 2<br>CALCF = 2<br>FASTF = 0<br>BUFFER = 4 | | | | | |
| 6 | INITF = 1<br>ENABLF = 1           ENABLF = 0<br>MOVEF = 2  MOVEF = 1  MOVEF = 0  MOVEF = 2<br>CALCF = 2                       CALCF = 1<br>FASTF = 0<br>BUFFER = 3 | | | | | |
| 7 | INITF = 1<br>ENABLF = 1           ENABLF = 0<br>MOVEF = 2  MOVEF = 1  MOVEF = 0  MOVEF = 2<br>CALCF = 1                       CALCF = 0<br>FASTF = 0<br>BUFFER = 2 | | | | | |
| 8 | INITF = 1<br>ENABLF = 1           ENABLF = 0<br>MOVEF = 2  MOVEF = 1  MOVEF = 0<br>CALCF = 0<br>FASTF = 0<br>BUFFER = 1 | | | | | |
| 9 | INITF = 1<br>ENABLF = 1<br>MOVEF = 0  MOVEF = 2  MOVEF = 1  MOVEF = 0<br>CALCF = 0<br>FASTF = 0  FASTF = 2           FASTF = 1<br>BUFFER = 0 | | | | | |
| 10 | INITF = 1<br>ENABLF = 1                                         ENABLF = 0<br>MOVEF = 2  MOVEF = 1  MOVEF = 0  MOVEF = 2  MOVEF = 1  MOVEF = 0<br>CALCF = 1                       CALCF = 0<br>FASTF = 1          FASTF = 0<br>BUFFER = 1 | | | | | |

PRODUCT SENSOR —56B

FIG. 8

NONCONTACT CONVEYOR FEEDER SYSTEM

This is a continuation of application Ser. No. 07/242,748, filed Sept. 8, 1988 (now abandoned).

BACKGROUND OF THE INVENTION

1. Field of the Invention

The present invention relates to conveyor feeder systems for supplying products to packaging machines at appropriate spacings and positions.

2. Description of the Prior Art

In commercial baking operations, products such as cookies emerge from a baking machine in a sequential but generally randomly spaced manner. Before they can be packaged by a wrapping machine, however, the cookies must be spaced from one another by predetermined distances, and positioned at precise locations. The wrapping machine generally has its own feed conveyor with a plurality of dividers known as dogs positioned at spaced locations thereon. The area between dogs is known as a flite, while the distance between the dogs is characterized as a flite length. The packaging machine will function properly only if one cookie is positioned between the dogs in each flite. Conveyor feeder systems receive the randomly spaced products from the baking machine, space the products at flite lengths with respect to one another, and synchronize their positions with the flites before transferring them to the wrapper conveyor.

Known conveyor feeder systems of the assignee of the present invention include a plurality of correction conveyors positioned upstream from the wrapper conveyor, and a conveyor drive system. The drive system includes a system processor, and a drive motor and associated command generator for each correction conveyor. The correction conveyors are initially driven at a one-to-one velocity ratio with respect to the wrapper conveyor. Sensors coupled to the system processor detect cookies on the correction conveyors and dogs on the wrapper conveyor. Each time a cookie is detected on one of the conveyors, the phase or positional error between the cookie and its desired position on a flite is computed by the system processor and downloaded to the command generator associated with the correction conveyor on which the cookie is located. The command generator then implements an error correction using a multi-segmented velocity profile switching technique to increase or decrease the speed of the correction conveyor with respect to that of the wrapper conveyor.

All error corrections are made over a constant command distance which is generally equal to the distance the cookie travels on the correction conveyor before being transferred to a subsequent conveyor. The error correction velocity of the correction conveyor is constant over the command distance, and is controlled by velocity clock values generated by the command generator and applied to a servo translator and amplifier system associated with the drive motor. The command generator includes a binary rate multiplier which produces pulse trains having frequencies determined as a function of the velocity clock values. Velocity of the drive motor and correction conveyor is determined by the frequency of the pulse train. Data representative of conveyor positions and distances of travel is stored in RAM of the command generator.

Feeder systems also typically include an accumulator or backlog conveyor which receives the randomly spaced cookies from the production machine. The velocity of the accumulator conveyor is controlled as a function of the velocity of the wrapper conveyor and the rate at which cookies are being received from the production machine. The accumulator conveyor backlogs or bunches up the cookies so they can be correctly positioned by the correction conveyors. In noncontacting conveyor systems the accumulator conveyor must be run at a sufficient speed to prevent sequential cookies from touching one another.

The system described above is optimized by controlling the velocity of the wrapper conveyor as a function of the rate of products produced by the production machine. Ideally, the feeder system will place one cookie in each flite. In practice, faulty wraps for which either zero or two cookies are placed in the same flite occur on occasion. In addition to associated waste of package and cookies, faulty wraps can jam the wrapper.

A variety of conveyor feeder systems for this and other applications also disclosed generally in the following U.S. Pat. Nos.: 3,335,841, Klingel et al.; 3,485,339, Miller et al.; 4,135,346, Rebsamen; 4,172,347, Nitz; 4,197,935, Aterianus et al.; 4,355,712, Bruno; 4,514,963, Bruno; 4,604,704, Eaves et al.; 4,653,630, Bravin; 4,640,408, Eaves.

The Klingel et al. U.S. Pat. No. 3,335,841 discloses the use of a control conveyor associated with a feed conveyor. The control conveyor is driven at a different speed than the feed conveyor and carries a plurality of driving members which are spaced at equal distances from one another. The driving members drop downward and engage the articles, thereby shifting their position as required for proper transfer into a conveying receptacle of the packaging machine.

The Miller et al. U.S. Pat. No. 3,485,339 discloses a system for spacing articles of different lengths. Articles are sequentially transferred from an entry conveyor to a spacing conveyor, approach conveyor, weight conveyor and exit conveyor. Motion of the spacing and approach conveyors is controlled by spacing control circuitry in response to the presence of articles optically detected thereon so as to position only one box on the weighing conveyor while weighing operations are being performed.

The Rebsamen U.S. Pat. No. 4,135,346 discloses apparatus for controlling the speed of operation of a packaging machine so as to assure a sufficient supply of objects to the machine while preventing undue accumulation. A signal processor receives signals from several sensors which indicate the passage of objects past selected points, and generates motor control signals as a function thereof.

The Nitz U.S. Pat. No. 4,172,347 discloses an electronic control system for controlling the sequence of operations of products moving on an indexing conveyor.

The Aterianus et al. U.S. Pat. No. 4,197,935 discloses a system for feeding spaced articles through a processing machine. The supplied articles are sequentially transferred to an accumulating conveyor, metering conveyor, infeed conveyor and wrapper. The infeed conveyor and metering conveyor are driven from a variable speed drive and are synchronized with the wrapper. An electrical circuit controls the operation of the various conveyors as a function of articles sensed thereon.

The Bruno U.S. Pat. No. 4,355,712 discloses apparatus for feeding products to a work station. A first conveyor receives a longitudinal row of products which are touching one another. A second conveyor receives products from the first conveyor and is driven at a speed greater than that of the first conveyor. Products on the second conveyor are detected by sensors. A control system controls the speed of the first conveyor in such a manner that products on the second conveyor are received at the same point in working cycles of a work station.

The Bruno U.S. Pat. No. 4,514,963 discloses a system for regulating the feed of articles to a wrapping machine. Sensors are arranged to provide signals indicative of the degree of any deviation of each article from a correct position in phase with the wrapping machine. A control circuit corrects the speed of the conveyor as a function of the detected deviation.

The Eaves et al. U.S. Pat. No. 4,604,704 discloses a high-speed microprocessor-controlled branch conveyor. The conveyor receives serial products from a supply conveyor, and adjustably conveys the products so as to establish a predetermined spacing therebetween. The products are transferred from supporting belts to the individual flites of a pusher member containing conveyor. Product flow is synchronized relative to an infeed conveyor to a wrapping station.

The Bravin U.S. Pat. No. 4,653,630 discloses a system for controlling the transfer of articles from a first conveyor belt to predetermined locations on a second conveyor belt. Signals representative of the position of the second belt are stored whenever an article arrives on the first belt. An error signal is generated and used to control the speed of the upstream belt and correct the article position with respect to the downstream belt. At each adjustment of the speed of the upstream belt a digital feedback signal is generated to progressively annul the error signal while the article position is being corrected.

The Eaves U.S. Pat. No. 4,640,408 discloses a feeder with automatic zoned product timing correction. The position of products on a separation belt relative to the position of a transfer conveyor flite is determined as being within one of five possible zones. Associated with each zone is a predetermined velocity change with respect to the separation belt which is required to move the product to the correct positional relationship.

It is evident that there is a continuing need for improved conveyor feeder systems. The system should be capable of accurately positioning the desired number of products in each and every flite of the wrapper. The system must also be capable of operating at high rates of speed to accommodate efficient production and wrapping machines. A noncontacting feeder system having these characteristics would be especially desirable.

SUMMARY OF THE INVENTION

A conveyor system in accordance with one embodiment of the present invention includes a receiving conveyor having a plurality of spaced product receiving flites, a receiving conveyor drive, and a drive control for controlling the receiving conveyor drive and for providing signals representative of the velocity of the receiving conveyor. Data representative of flite positions on the receiving conveyor is provided by a receiving conveyor monitor. A first feed conveyor upstream from the receiving conveyor receives products and provides the products to the receiving conveyor. A first feed conveyor drive responsive to drive control signals is coupled to the first feed conveyor. Data representative of product positions on the feed conveyor is provided by a feed conveyor monitor. A first feed conveyor product positioning drive control system controls the feed conveyor drive so as to shift positions of products on the feed conveyor relative to flites on the receiving conveyor. The control system includes means for computing positional errors of products on the feed conveyor with respect to target flites, and means for characterizing the positional errors as being in one of a plurality of condition flag states representing ranges of positional errors. Also included are means for characterizing fill states of the target flites and flites previous to the target flites as being in one of a plurality of full flag states. Means for characterizing position correction distances between the positions of the products on the first feed conveyor and selected flites on the receiving conveyor as a function of full flag states and condition flag states are included. Feed conveyor drive control signals for controlling the velocity of the feed conveyor and causing positions of the products on the first conveyor to be shifted by the correction distances with respect to the receiving conveyor are generated by the drive control system.

Another embodiment of the conveyor system includes a receiving conveyor, a receiving conveyor drive, and a receiving conveyor encoder for providing data representative of the velocity of the receiving conveyor. A feed conveyor upstream from the receiving conveyor receives products and provides the products to the receiving conveyor. A feed conveyor drive responsive to drive control signals is coupled to the feed conveyor. A product monitor provides data representative of product positions on the feed conveyor. A drive control system for the feed conveyor includes current product spacing memory for storing data representative of the distances between adjacent products on the feed conveyor, and desired product spacing memory for storing data representative of desired distances between adjacent products. State variable data characteristic of operational status of the feed conveyor drive control system and products on the feed conveyor are stored by state variable memory. State transition table data characterizing drive control system operation as a function of the state variable data is stored by state transition table memory. The drive control system also includes a processor which provides the drive control signals for controlling the speed of the feed conveyor as a function of the current and desired product spacing, state variable data and state transition table data.

BRIEF DESCRIPTION OF THE DRAWINGS

FIG. 8 is a time sequential illustration of product configurations on a conveyor shown in FIG. 1 and corresponding states of the state flag values used by the spacing drive subsystem.

DETAILED DESCRIPTION OF THE PREFERRED EMBODIMENTS

System Overview

Figure 1:
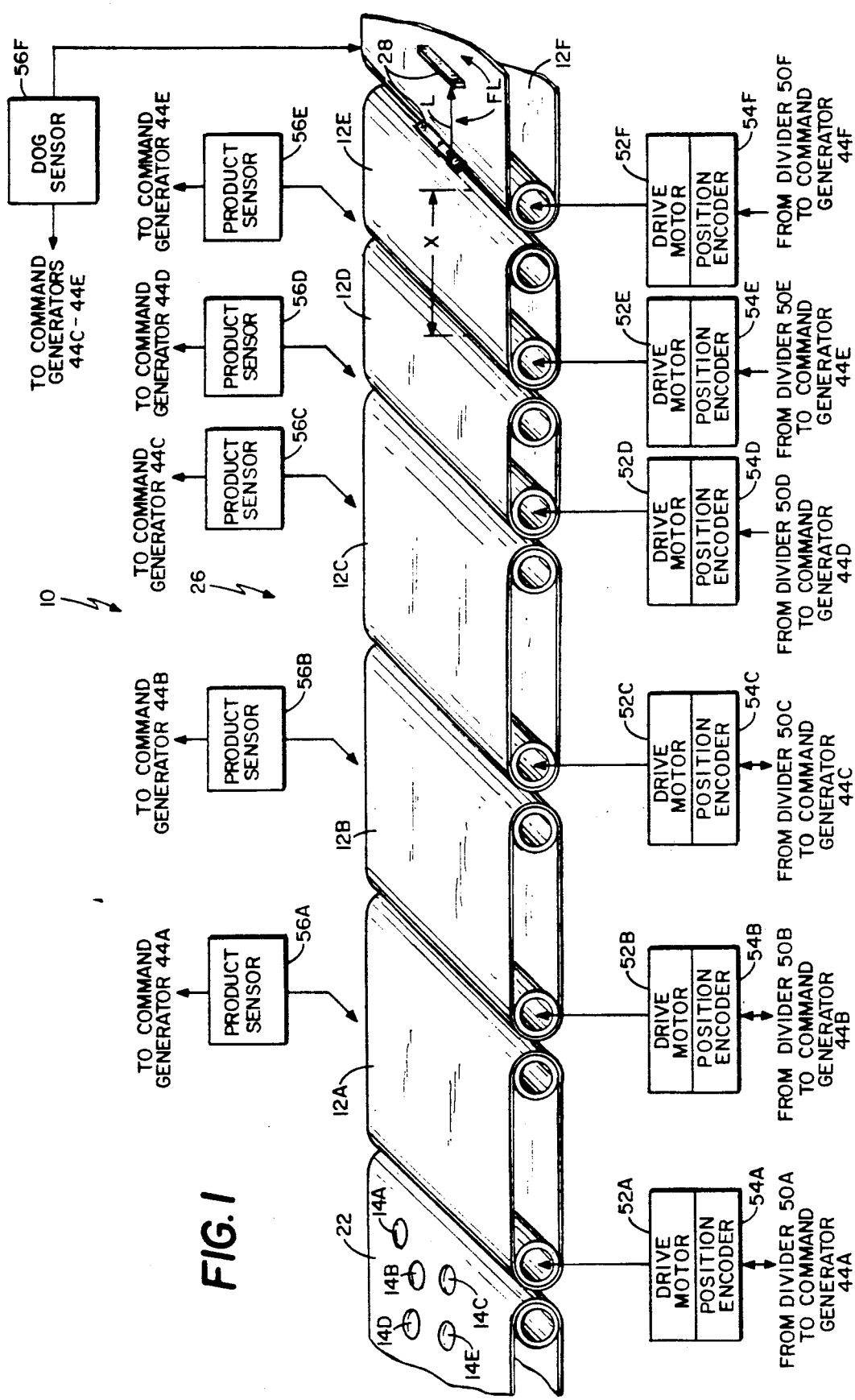
FIG. 1 is a block diagram representation of conveyors and portions of a drive control system of a noncontacting conveyor feeder system in accordance with the present invention.
Figure 2:
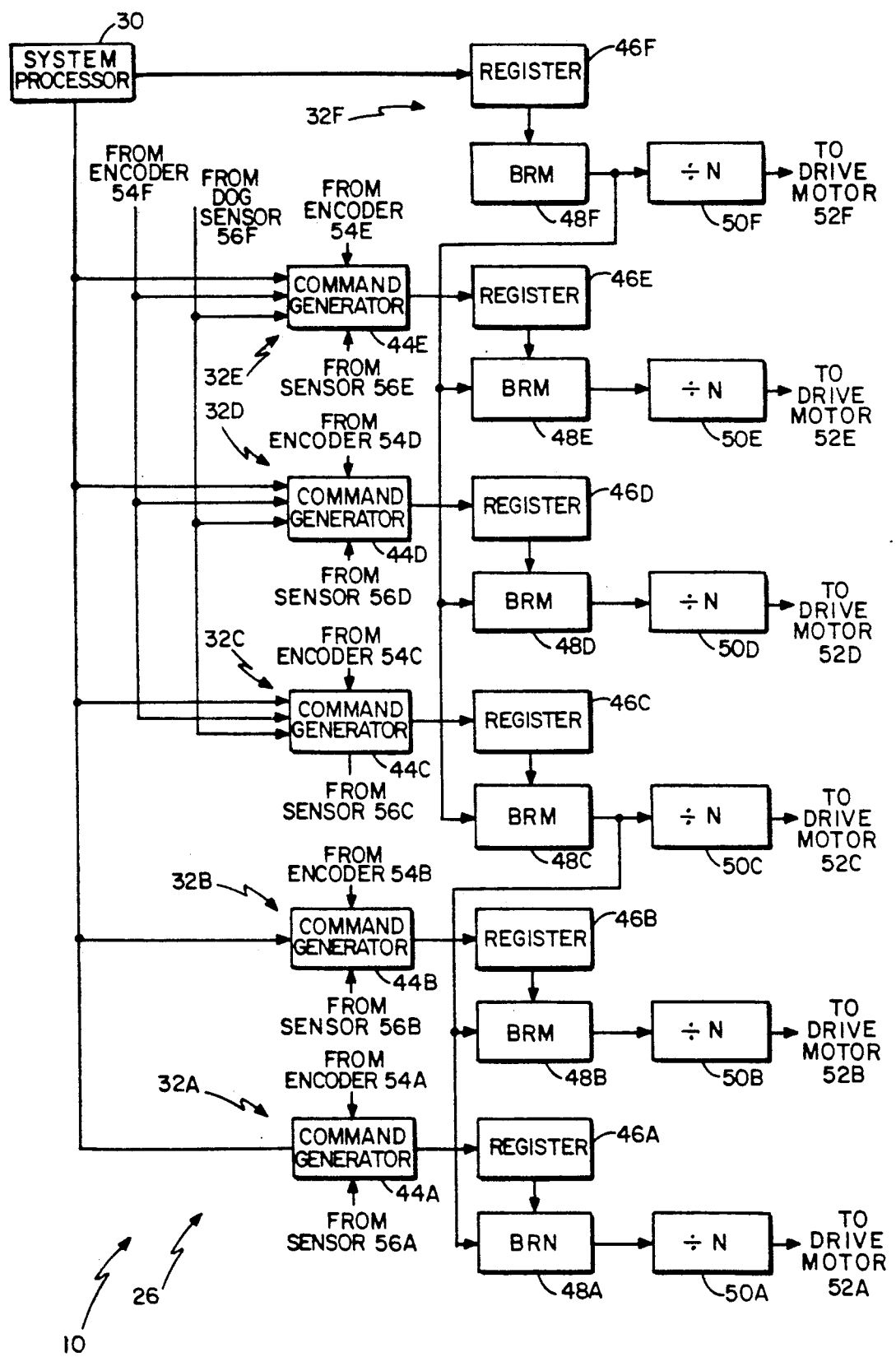
FIG. 2 is a block diagram representation of additional portions of the drive control system not shown in FIG. 1.

Various sections of a noncontact conveyor feeder system 10 in accordance with the present invention are illustrated generally in FIGS. 1 and 2. Feeder system 10 includes a plurality of belt-type conveyors 12A–12E and a drive control system 26. Conveyors 12A–12E are positioned end-to-end with respect to one another and in a continuous path between a feed conveyor 22 and a product wrapping machine (not shown). In one embodiment conveyors 12A–12C are sixteen inches in length, while conveyors 12D–12E are eight inches in length. A serial stream of generally randomly spaced but noncontacting or nontouching products 14A–14E from a production machine (not shown) are supplied to conveyor 12A by feed conveyor 22. From conveyor 22, products 14A–14E are sequentially transferred to belts 12A–12F and the wrapper. The terms feed and upstream are intended herein as interchangeable, as are the terms receiving and downstream.

Conveyor 12F is the wrapper conveyor and has a plurality of dogs 28 which are separated from one another by predetermined flite lengths L (eight inches in one embodiment). The area between any two adjacent dogs 28 is called a flite FL. Drive control system 26 monitors the positions of dogs 28 on conveyor 12F and the positions of products such as 14A–14E on conveyors 12A–12E, and individually controls the speed of conveyors 12A–12E as a function of the monitored data in accordance with stored programs. Conveyors 12A and 12B are independently driven in such a manner as to space products 14A–14E at flite lengths L (or effective conveyor lengths equal to flite lengths L) with respect to one another. Conveyors 12C–12E are independently driven in such a manner as to accurately position one product such as 14A–14E at a predetermined location within each flite FL. Products 14A–14E are thereby synchronized or properly positioned with the wrapper when delivered thereto by conveyor 12F. All of these operations take place in real time at high speed, permitting optimum use of the wrapper.

Drive control system 26 includes system processor 30, product spacing drive subsystems 32A and 32B, product positioning drive subsystems 32C–32E, and wrapper drive subsystem 32F. Drive subsystems 32A–32F drive and control the speed of conveyor belts 12A–12F, respectively. As shown, drive subsystems 32A–32F each include a register 46A–46F, binary rate multiplier or BRM 48A–48F, divider 50A–50F, drive motor 52A–52F, position encoder 54A–54F, and sensor 56A–56F. Drive subsystems 32A–32E also include command generators 44A–44E, respectively.

Drive motors 52A–52F are mechanically coupled to respective conveyors 12A–12F. Drive command signals received in the form of a train of pulses are applied to servo translator and amplifier systems (not shown) which control motors 52A–52F. Pulses of the drive signals produce known incremental amounts of rotation of drive motors 52A–52F. The velocity at which conveyor belts 12A–12F are driven can therefore be regulated by controlling the drive signal pulse frequency. Position encoders 54A–54F process the drive signals received by respective motors 52A–52F, and provide position encoder signals proportional to the number of pulses in the drive signals. The information contained in the position encoder signals provided by position encoders 54A–54F therefore accurately represents the distance that associated conveyors 12A–12F have been driven. Alternatively, this information can be stored in RAM when command generators 44A–44E produce data representative of the drive signals. Drive motors and position encoders of these types are known and commercially available.

Sensors 56A–56E are preferably optical sensors positioned with respect to conveyor belts 12A–12E, respectively, to provide product position signals representative of the position of products such as 14A–14E on the conveyors. In the embodiment shown in FIG. 1, product sensors 56A–56C are positioned at the center of the length of associated conveyors 12A–12C. Sensor 56D is positioned to sense products 14A–14E being transferred between conveyors 12C and 12D. Sensor 56E is positioned to sense products at the transfer point between conveyors 12D and 12E. Sensor 56F is mounted at a predetermined location with respect to conveyor 12F, and optically senses the presence of dogs 28.

The overall operation of drive control system 26 is coordinated and controlled by system processor 30. System processors 30 such as the MTS Model 473.60c include random access and read only memory (not separately shown) in which a variety of system parameters and an overall operating program are stored. Executing the operating program and using the stored system parameters, system processor 30 calculates a wrapper velocity Vw at which wrapper conveyor 12F must be driven to accommodate all of the products 14A–14E currently being produced by the production machine and supplied by feed conveyor 22. Wrapper velocity Vw can also be determined as a function of information received from command generators 44A–44E representative of the rate at which products are being received from conveyor 22. The wrapper Vw can then be optimized to accommodate all products 14A–14E being produced by the production machine. System processor 30 then generates a digital wrapper conveyor velocity clock value VCLKw representative of the required speed of wrapper conveyor 12F, and stores this velocity clock value in a buffer location of random access memory (RAM). From the buffer location velocity clock value VCLKw is loaded in register 46F, and signals representative thereof applied to BRM 48F. In another embodiment (not shown), a command generator such as 44A–44E is coupled between system processor 30 and register 46F. The command generator generates the appropriate velocity clock value in response to signals from systems processor 30. BRM 48F generates a train of pulses having a frequency proportional to velocity clock value VCLKw, and at a multiple N of the frequency required to drive wrapper conveyor 12F at the desired speed. Divider 62 functions as a filter and divides the frequency of the pulse train provided by BRM 48F by an integer N before it is applied to drive motor 52F. The speed at which drive motor 52F rotates and the velocity of wrapper conveyor 12F are therefore controlled as a function of the velocity clock value VCLKw generated by system processor 30 and stored in register 46F.

Positioning Drive Subsystems 32C-32E

As shown in FIG. 2, command generators 44C-44E of corresponding drive subsystems 32C-32E are connected to receive data and control signals from system processor 30, position encoder signals from the wrapper conveyor position encoder 54F, and dog position signals from dog sensor 56F. In addition, command generators 44C-44E are connected to receive position encoder signals and product position signals from their respective position encoders 54C-54E and product sensors 56C-54E. Command generators 44A-44E are microprocessor-based devices such as the MTS Model 473.61c-02A, and include associated random access memory (RAM) and read only memory (ROM).

Product positioning drive subsystems 32C-32E control the velocity of their associated conveyors 12C-12E in such a manner as to position (or attempt to position) products 14A-14E at precise locations within flites FL on wrapper conveyor 12F. Specifically, positioning drive subsystems 32C-32E associate each product 14A-14E on respective conveyors 12C-12E with a "target" flite FL on wrapper conveyor 12F. The velocities of conveyors 12C-12E are then controllably varied, relative to the velocity of conveyor 12F, as a function of a positional error PE of the product 14A-14C with respect to its associated target flite FL, and stored information characteristic of the current fill state of the associated target flite and the flite previous to (i.e., immediately before) the target flite. Positioning drive subsystems 32C-32E function entirely independent from one another but in an identical manner. These positioning corrections are optimized to achieve the maximum reliable packaging rate, according to the size (length) of the products 14A-14E, maximum velocity of wrapper conveyor 12F, and physical attributes of the products such as their friction with respect to conveyors 12A-12F and their consistency. The improved control capability allows the conveyor sections to be quite short, lowering conveyor cost and saving valuable floor space. The following detailed description of positioning drive subsystem 32E is representative of the operation of drive subsystem 32C and 32D as well.

Register 46E, BRM 48E, divider 50E, drive motor 52E and position encoder 54E of positioning drive subsystem 32E function in a manner identical to their counterparts in wrapper drive system 32F and described above. Velocity clock values VCLK representative of a desired velocity of conveyor 12E are loaded into register 46E. BRM 48E receives signals representative of velocity clock value VCLK, and produces a train of pulses having a frequency determined as a function of the value. After having its frequency divided by divider 50E, the pulse train is applied to drive motor 52E, through a servo translator and amplifier system, as the motor drive signal.

BRM 48E also has an input connected to receive the train of pulses produced by BRM 48F of wrapper drive subsystem 32F. In response to a one-to-one (1:1) ratio velocity clock value VCLK1 loaded into register 46E, BRM 48E will generate a train of pulses having a frequency identical to that received from BRM 48F. In this manner positioning drive subsystem 32E can cause its associated conveyor 12E to be driven at a velocity equal to, or synchronized at a 1:1 ratio with, the velocity of wrapper conveyor 12F.

Positioning subsystem 32E implements a two-segmented velocity profile switching scheme to correct for positional errors PE of product 14A-14E on conveyor 12E with respect to the desired position on their associated target flites FL. The two-segmented velocity profile switching technique is described generally with reference to FIG. 3. At time t0 a leading (i.e., the forward) edge of a product such as 14A is detected by product sensor 56E as it is transferred from conveyor 12D to conveyor 12E. In the example illustrated in FIG. 3, conveyor 12E is being driven at a velocity equal to velocity Vw of wrapper conveyor 12F. Velocity Vw is characterized as the second segment 60 of the then current velocity profile. Unless conveyor 12E is correcting the position error PE of a previously detected product when product 14A is detected, the velocity of second segment 60 will typically be equal to velocity Vw of wrapper conveyor 12F (i.e., register 46E is loaded with velocity clock value VCKL1).

As conveyor 12E continues its motion, a trailing edge of the product 14A will be transferred onto conveyor 12E at time t1. Command generator 44E then makes a real time calculation, in the manner describe below, of the correction distance CD that product 14A must be moved to properly position it in the desired flite FL, a correction velocity Vc and associated velocity clock value VCLK, and a correction time tc that conveyor 12E must be driven at velocity Vc to move the product the correction distance CD. After making these calculations and storing values VCLK and tc in a buffer, command generator 44E will implement a new error correcting velocity profile having a first segment 62 and a second segment 64. During first segment 62 the velocity clock value VCLK is loaded into register 46E and causes the velocity of conveyor 12E to switch, and accelerate or decelerate from wrapper velocity Vw to correction velocity Vc for correction time tc. Following the expiration of first segment 62, velocity clock value VCLK1 is loaded into register 46E. Conveyor 12E is then accelerated or decelerated to and driven at a velocity equal to wrapper velocity Vw during second segment 64. Second segment 64 of this velocity profile is assumed to extend an infinite length of time or distance, and is only altered when a subsequent error correcting velocity profile is being implemented. The switching between segments such as 60, 62 and 64 of the velocity profiles is assumed to be done with infinite acceleration and virtually no aberrations. First segment 62 terminates prior to the time t2 at which product 14A is transferred to conveyor 12F. As is evident from the above description, the relative velocities of conveyors 12E and 12F are switchably altered by drive subsystem 32E to move product 14A by a correction distance CD with respect to the position it would have had on the wrapper conveyor if the velocities remained synchronized.

In the course of implementing the error correcting velocity profile scheme outlined generally above, command generator 44E senses, computes or receives from system processor 30 a number of parameters in addition to those described above. A list and description of these parameters follows in Table 1. Parameters indicated by a plus sign (+) are those associated with correction distances CD for which conveyor 12E must be speeded up to correct ("positive errors"), while those indicated by a minus sign (−) are those associated with correction distances CD that are compensated for by slowing the conveyor down ("negative errors"). Parameters having both positive error and negative error values are referred to generally in the remainder of this description without either the + or − signs.

TABLE 1

| | |
|---|---|
| t0 = | Time leading edge of product contacts conveyor |
| t1 = | Time trailing edge of product contacts conveyor |
| t2 = | Time product transfers to next conveyor |
| tc+ = | Correction time for positive errors |
| tc− = | Correction time for negative errors |
| Vmax = | Maximum conveyor velocity |
| Vmin = | Minimum conveyor velocity |
| Vw = | Wrapper conveyor velocity |
| Vwm = | Maximum wrapper conveyor velocity |
| Vc+ = | Correction velocity for positive errors |
| Vc− = | Correction velocity for negative errors |
| Dc+ = | Correction command distance for positive errors |
| Dc− = | Correction command distance for negative errors |
| Dmin = | Effective minimum correction |
| Dmax = | Effective maximum correction |
| P+ = | Maximum positive percent of correction |
| P− = | Maximum negative percent of correction |
| Do = | Dog offset value |
| PE = | Positional errors of product with respect to desired position on target flite |
| CD = | Correction distance of product with respect to desired position on flite in which it is to be positioned |
| DOGPOS = | Position of conveyor when dog detected |
| PROPOS = | Position of conveyor when product detected |
| X = | Effective length of conveyor (length between sensor and leading edge) |
| L = | Flite length |

To increase the efficiency of feeder system and permit real-time calculations and error correcting velocity profile switching, system processor 30 precalculates a number of the parameters described in Table 1 and downloads them to command generators 44C–44E. System parameters from which processor 30 calculates the precalculated values are programmed into the processor through a keyboard or other means (not shown). Precalculated values include the maximum velocity Vwm of wrapper conveyor 12F. Velocity Vwm is essentially a worst case value characterizing the velocity of wrapper conveyor 12F when product flow is operating at its maximum capacity. Velocity Vwm is computed in accordance with Equation 1 below as a function of the number of products 14A–14C received per second, and the length L of flites FL.

$$Vwm = (\text{number of products/sec}) \times \text{flite length } L \qquad \text{Eq. 1}$$

As discussed above, all error corrections are made while products 14A–14C are positioned on conveyor 12E. The first segment 62 of all error correction velocity profiles implemented by positioning drive subsystem 32E are made over correction command distances Dc of a predetermined length. Command distance dc+ is the distance that conveyor 12E is moved when implementing velocity profiles require to correct positive errors, while command distance Dc− is the distance that conveyor 12E is moved when implementing velocity profiles required to correct negative errors. Since command distance Dc+ and Dc− are constant, they relate correction velocities Vc+ and Vc− to the correction time tc. Positive error command distance Dc+ and negative error command distance Dc− are computed in accordance with Equation 2 and 3 below as a function of the length X of conveyor 12E, the size (length) of products 14A–14E, and a margin of safety.

$$Dc+ = X - \text{product length} + \text{safety margin} \qquad \text{Eq. 2}$$
$$Dc- = X - \text{product length} \qquad \text{Eq. 3}$$

It is also advantageous to know the maximum and minimum correction velocities Vmax and Vmin, respectively, at which conveyor 12E can be driven during error correcting velocity profiles. These parameters will depend on the operating characteristics of drive motor 52E, as well as the amount of friction between products 14A–14E and conveyor 12E. As described by Equations 4 and 5 below, parameters Vmax and Vmin are computed as a function of the positive and negative percent correction values P+ and P−, respectively, and the maximum velocity Vwm of wrapper conveyor 12F. Percent correction values P+ and P− are fixed parameter stored in system processor 30.

$$Vmax = P+ \times Vwm \qquad \text{Eq. 4}$$

$$Vmin = P- \times Vwm \qquad \text{Eq. 5}$$

Minimum amounts of correction time tc+ and tc− available for positive and negative error corrections, respectively, are precalculated by system processor 30. These values are calculated as a function of the command distances Dc+, Dc− and the correction velocities Vmax and Vmin, in accordance with Equations 6 and 7 below.

$$tc+ = Dc+/Vmax \qquad \text{Eq. 6}$$

$$tc- = Dc-/Vmin \qquad \text{Eq. 7}$$

Maximum and minimum correction distances CD are precalculated. The maximum error which can be corrected, Dmax, is determined as a function of maximum correction velocity Vmax, maximum wrapper conveyor velocity Vwm, and the minimum correction time for positive errors tc+. The minimum correction distance that the product can be moved, Dmin, is determined as a function of the maximum wraper conveyor velocity Vwm, the minimum correction velocity Vmin, and the minimum amount of time available to correct for negative errors tc−. These relationships are set out in Equations 8 and 9 below.

$$Dmax = (Vmax - Vwm) \times tc+ \qquad \text{Eq. 8}$$

$$Dmin = (Vwm - Vmin) \times tc- \qquad \text{Eq. 9}$$

System processor 30 also computes the velocity clock value VCLK1 which must be loaded into register 46E in order to cause conveyor 12E to be driven at a velocity equal to that of wrapper conveyor 12F. Velocity clock value VCLK1 will be computed as a function of wrapper velocity clock value VCLKw and parameters specific to BRM 48E.

Figure 4:
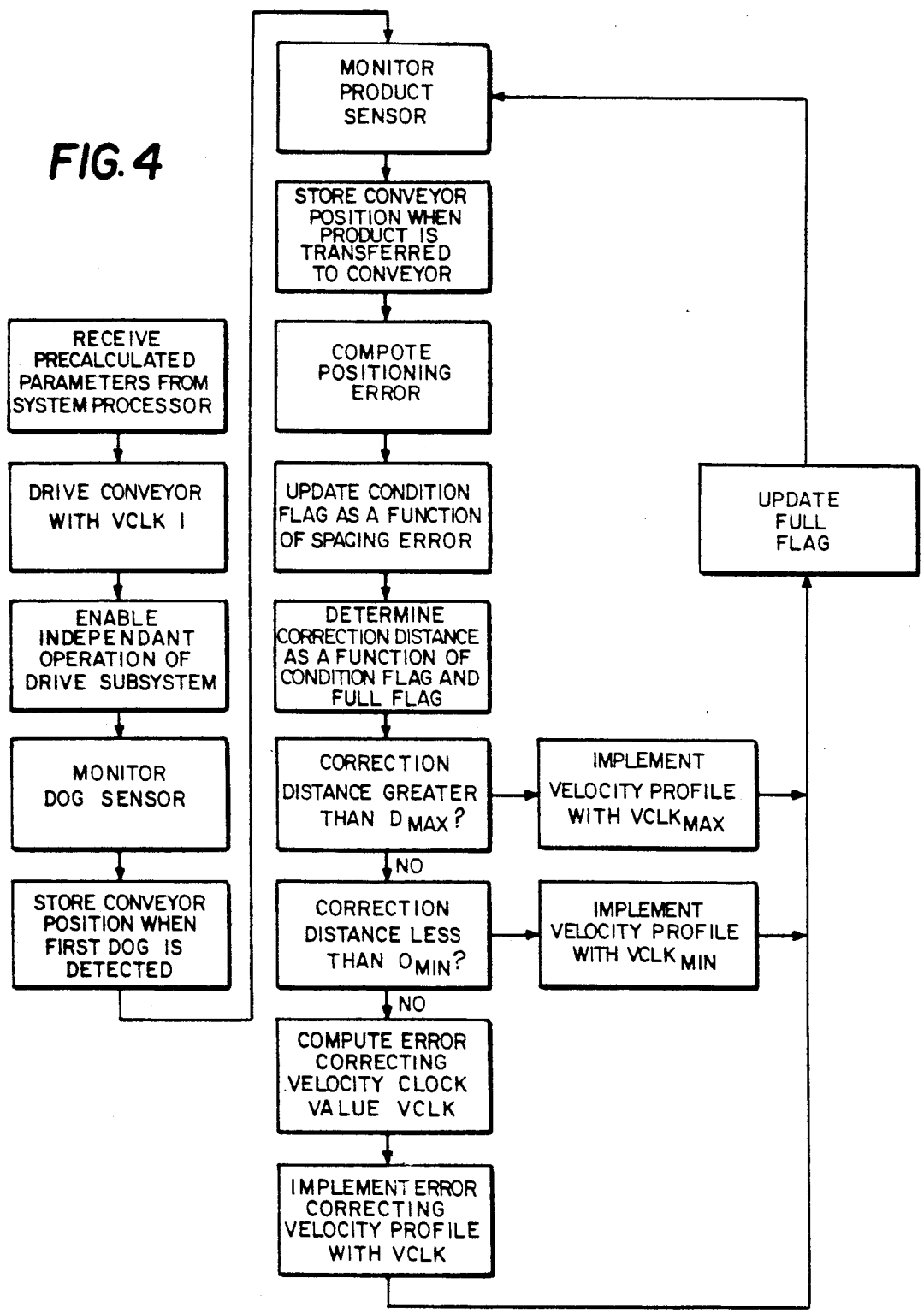
FIG. 4 is a flow chart describing the operation of the product positioning drive subsystem shown in FIG. 1.

The programmed sequence of steps followed by command generator 44E to place products 14A–14C at the proper locations in the desired flites FL is described generally with reference to FIG. 4. Command generator 44E is initialized when system parameters, including the precalculated parameters described above, are downloaded from system processor 30 and stored within the command generator. Velocity clock value VCLK1 is then loaded into register 46E causing conveyor 12E to be driven at a one-to-one velocity ratio with respect to the velocity of wrapper conveyor 12F (i.e., at a speed which would place one product 14A-14E in each flite FL). System processor 30 then enables drive subsystem 32E, causing it to operate independently in its product positioning mode.

After entering the product positioning mode, command generator 44E monitors signals received from dog sensor 56F. Upon receipt of signals from sensor 56F indicating the detection of a first dog 28, command generator 44E stores dog position data DOGPOS characterizing a first current position of conveyor 12E as a function of position encoder signals received from position encoder 54F. As the operation of feeder system 10 continues, command generator 44E continuously monitors product sensor 56E. Upon receipt of signals from product sensor 56E indicating that a product such as 14A has been completely transferred to conveyor 12E (e.g. the trailing edge of the product has cleared the sensor), command generator 44E stores product position data PROPOS representative of the then current position of conveyor 12E as a function of signals received from position encoder 54E. Using the information described above, command generator 44E computes and determines the following:

1. The positional error PE of product 14A from the desired position (e.g., in the center) of its associated target flite FL;
2. Which flite FL product 14A should be positioned in. The three possibilities in the described embodiment include the associated target flite, the previous flite, (i.e. the flite before the target flite), or the next flite (i.e. the flite after the target flite);
3. The correction distance CD product 14A must be moved to be positioned in the desired flite; and
4. The velocity profile which must be implemented to move product 14A by correction distance CD.

The step of determining the positional error PE can be described with reference to FIG. 5 in which portions of a target flite FLt, previous flite FLp and next flite FLn are shown. Target flite FLt is essentially the flite in which product 14A "would" or "should" be positioned if conveyor 12E was continued to be driven at a one-to-one velocity ratio with respect to wrapper conveyor 12F. After making the determination that product 14A has been completely transferred to conveyor 12E, command generator 44E associates the product with a target flite such as FLt. This association (i.e., the phase relationship between products on conveyor 12E and their target flite FLt) is illustrated graphically in FIG. 5 where product 14A, illustrated in phantom, is shown transposed to various example positions A-E with respect to flites FLn, FLt and FLp.

Drive subsystem 32E varies the velocity of conveyor 12E so as to shift the position of product 14A with respect to target flite FLt, so that it will have a positional error PE equal to zero when transferred to wrapper conveyor 12F. In the embodiment illustrated in FIG. 5, positional errors PE are characterized as the distance of the trailing edge of product 14A from the center of target flite FLt. Product 14A transposed to example position E therefore has a positional error PE equal to zero. Under the convention used by command generator 44E, products 14A shown transposed to positions B and D have negative positional errors PE, while those shown in positions A and C have positive positional errors.

The positional error PE of products 14A is computed by command generator 44E as a function of a sum of dog offset value DO (which characterizes the distance between the location of dog sensor 56F and the position of sensed dog 28 when the target flite FL is in position to receive product 14A), and a difference between conveyor positions DOGPOS and PROPOS. This calculation is made in accordance with Equation 10 below immediately after product 14 has been transferred to conveyor 12E.

$$PE = DOGPOS - PROPOS + DO \qquad \text{Eq. 10}$$

Command generator 44E next makes a real-time determination as to which of flites FLn, FLt and FLp product 14A should be positioned in. This determination is made as a function of the magnitude and sign of the just computed positional error PE of product 14A, and the fill state of flites FLt and FLp (i.e. whether flites FLt and FLp already have a product in them). In the course of making this determination, command generator 44E characterizes the previously computed positional error PE of product 14A as being within one of four discrete or quantized condition flag states. Possible condition flag states CF1–CF4 are listed below in Table 2, and described with reference to FIG. 5.

TABLE 2

| CONDITION FLAG STATE TABLE | |
|---|---|
| CONDITION FLAG CF | POSITIONAL ERROR PE |
| CF1 | $E1 > PE > 0$ |
| CF2 | $-E1 \leq PE \leq 0$ |
| CF3 | $PE \geq E1$ |
| CF4 | $PE < -E1$ |

If positional error PE is less than error E1 but greater than zero (e.g. if product 14A is in example positions A), it is characterized by a first condition flag CF1. If product 14A has a positional error PE greater than or equal to $-E1$, but less than or equal to zero (e.g. if product 14A is in example position B), the positional error is characterized by second condition flag CF2. Positional errors PE greater than or equal to E1 are characterized by condition flag CF3, while those less than $-E1$ are characterized by condition flag CF4.

Figure 5:
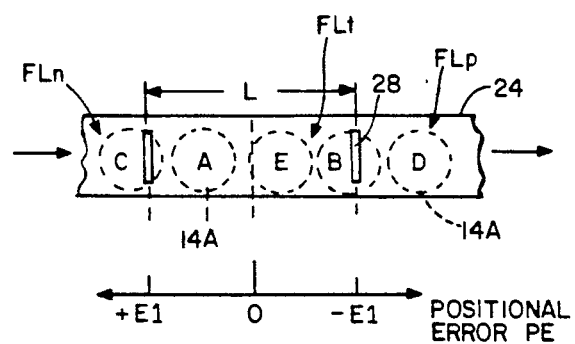
FIG. 5 is a graphical representation of products on conveyors shown in FIG. 1 having different positional phase errors with respect to a wrapper conveyor.

In the embodiment shown in FIG. 5 a positional error PE equal to E1 places product 14A at dog 28 on the leading edge of target flite FLt. positional error PE equal to E1 places product 14A at dog 28 on the leading edge of target flite FLt. Positional errors PE equal to $-E1$ place product 14A at dog 28 on the trailing edge of target flite FLt. For purposes of determining the magnitude of positional errors E1 and $-E1$, a variety of factors such as the length X of conveyor 12E, flite length L, performance criteria of drive subsystem 32E, and the amount of friction existing between products 14A-14E and conveyors 12A-12F are taken into account. Data representative of that described by Table 2 is stored in RAM of command generator 44E.

The fill state of target flites such as FLt and flites previous to the target flites such as FLp are characterized as being in one of three possible full flag states in the embodiment described herein. Full flag states FF1-FF3 are characterized below in Table 3.

TABLE 3

| FULL FLAG | FILL STATE OF TARGET AND PREVIOUS FLITE |
|---|---|
| FF1 | PREVIOUS FLITE EMPTY |
| FF2 | TARGET FLITE EMPTY |
| FF3 | TARGET FLITE FULL |

If previous flite FLp is empty, in which case the target flite FLt will also be empty, the fill state is characterized by full flag FF1. If target flite FLt is empty and previous flite FLp is full, the fill state is characterized by full flag FF2. Full flag FF3 characterizes fill states for which target flite FLt is already full and previous flite FLp is also full. Data representative of that illustrated in Table 3 is stored in RAM or ROM of command generator 44E.

Command generator 44E selects the flite FLn, FLt or FLp into which product 14A is to be positioned as a function of the current states of condition flag CF and full flag FF. This selection is made in accordance with predetermined positioning criteria specified in Flite Selection State Table 4, data representative of which is stored in RAM or ROM of command generator 44E. Full Flag Start and Condition Flag refer to the current states of the full flag and condition flag, respectively, upon which the selection decision is based. Correction distance Dc+ or Dc− is the positional shift of conveyor 12E with respect to conveyor 12F which is required to center product 14A into the flite selected from FLn, FLt and FLp.

TABLE 4

| FLITE SELECTION STATE TABLE | | | |
|---|---|---|---|
| FULL FLAG START | CONDITION FLAG | FULL FLAG END | CD |
| FF1 | CF4 | FF1 | PE + X |
|  | CF1 | FF2 | PE |
|  | CF2 | FF2 | PE |
|  | CF3 | FF3 | PE − X |
| FF2 | CF1 | FF2 | PE |
|  | CF2 | FF2 | PE |
|  | CF3 | FF3 | PE − L |
|  | CF4 | FF2 | PE |
| FF3 | CF1 | FF3 | PE − L |
|  | CF2 | FF3 | PE − L |
|  | CF3 | FF3 | PE − L |
|  | CF4 | FF2 | PE |

Under some condition states such as FF2 and CF1, FF2 and CF2, and FF3 and CF4, command generator 44 is constrained by the criteria of Table 4 to place product 14A in its associated target file FLt. Correction distance CD is therefore set equal to positional error PE. Under other condition states, such as FF1 and CF4, the criteria of Table 4 calls for the placement of product 14A in previous flite FLp. Correction distance CD is therefore set equal to positional error PE plus one conveyor length X. Under still other condition states such as FF1 and CF3, FF2 and CF3, and FF3 and CF1, target file FLt is either full or the positional error PE is so great that drive subsystem cannot correct for the error. Under these conditions the criteria of State Table 4 will place product 14A in the center of next flite FLn by setting correction distance CD equal to positional error PE minus a conveyor length X.

The "current" state of the full flag must be updated after data representative of Table 4 has been accessed by command generator 44E to determine in which flite FL product 14A is to be placed. Updated full flag values Full Flag End are also included in Table 4. By way of example, if product 14A is to be positioned in next flite FLn (e.g. when Full Flag Start and Condition Flag are in their FF1 and CF3, FF2 and CF3, or FF3 and CF2 states, respectively), the "target" flite for subsequent product 14B will already be full. Full Flag End, i.e. Full Flag Start for the flite selection of product 14B, is therefore updated and set to its FF3 state.

Having determined the correction distance CD in the manner described above, command generator 44E next calculates the parameters of the velocity profile which will implement this correction. In preferred embodiments, these calculations are made in real-time immediately following the determination of the correction distance CD. Command generator 44E first compares correction distance CD with the stored values for the maximum and minimum correction distances Dmax and Dmin, respectively. Should correction distance CD be greater than the maximum correction distance Dmax or less than the minimum correction distance Dmin, command generator 44E generates and loads a velocity clock value VCLK corresponding to Vmax or Vmin, respectively, into register 46E. Conveyor 20 will then be driven at maximum velocity Vmax or minimum velocity Vmin over command distances Dc+ or Dc−, respectively, in an attempt to correct for correction distance CD. Command generator 44E monitors signals from position encoder 54E and can thereby determine when conveyor 12E has been driven the command distance Dc. If this action was to occur with products 14A-14E on conveyor 12E, the product would not be properly placed within the desired flite FL. However, if these actions were to occur with products 14A-14E on conveyors 12C or 12D, positional errors PE would likely be reduced to such an extent that they could be corrected by the actions of subsequent conveyors such as 12D and 12E.

Correction distance CD will typically be within maximum correction distance Dmax and minimum correction distance Dmin. The required correction velocity Vc to be implemented during the first segment 62 of the spacing error correction velocity profile (illustrated generally in FIG. 3) can be calculated by relating equations describing correction time tc as described below in Equation 11.

$$tc = \frac{Dc}{Vc} = \frac{CD}{Vd} \quad \text{Eq. 11}$$

where: Vd=Vc−Vw.

For ease of computations, differential velocity Vd and correction velocity Vc are specified in terms of a multiple of, or ratio with respect to, velocity Vw of wrapper conveyor 12F. Wrapper velocity Vw is therefore normalized to a value of one as described by Equation 12 below. Correction velocity Vc can then be determined as a function of the differential velocity Vd as described by Equation 13.

$$Vw = 1 \text{(velocity at ratio of 1)} \quad \text{Eq. 12}$$

$$Vc = Vd + 1 \quad \text{Eq. 13}$$

Equation 15 below can then be derived by substituting the value for correction velocity Vc given in Equation 13 into Equation 11.

$$\frac{Dc}{Vd+1} = \frac{CD}{Vd} \qquad \text{Eq. 14}$$

By rearranging the terms given in Equation 14, the relationship described by Equation 15 can be derived.

$$Vd = \frac{CD}{Dc - CD} \qquad \text{Eq. 15}$$

By again making use of the relationship described by Equation 13, and rearranging terms, correction velocity Vc can be determined as a function of command distance Dc and correction distance CD. This relationship is described below in Equation 16.

$$Vc = \frac{Dc}{Dc - CD} \qquad \text{Eq. 16}$$

Equation 16 describes correction velocity Vc in terms of a ratio or multiple of wrapper velocity Vw. If correction distance CD is a positive value, command generator 44E will use positive command distance Dc+ for calculation purposes in Equation 16, resulting in a positive correction velocity Vc+. Similarly, command generator 44E must make use of negative error command distance Dc— when correction distance CD is a negative value, resulting in a negative error correction velocity Vc—.

Figure 3:
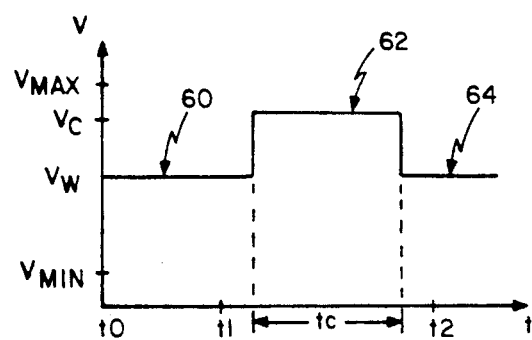
FIG. 3 is a graphical representation of a product positioning error correcting velocity profile implemented by a product positioning drive subsystem of the control system shown in FIG. 1.

After computing correction velocity Vc, command generator 44E determines the corresponding velocity clock value VCLK and stores this value in buffer memory. From the buffer memory the velocity clock value VCLK is immediately loaded into register 46E. The velocity profile will then switch to a new first segment 62 from second segment 60 of the previous profile (FIG. 3). Signals from position encoder 54E are then monitored, and velocity clock value VCLK1 is then loaded into register 46E after conveyor 12E has been moved through command distance Dc+ or Dc—. The velocity profile is thereby switched to its second segment 64 so product 14A will be traveling at a velocity equal to wrapper velocity Vw as it is transferred to wrapper conveyor 12F. Since correction velocities Vc+ and Vc— are computed to be implemented or distributed over predetermined and constant command distances Dc+ or Dc—, respectively, corresponding values for correction time tc will vary with different correction distances CD.

The above described operations implemented by positioning drive subsystem 32E are repeated for all products such as 14B–14E subsequently detected by sensor 56E. However, after being initially synchronized with the position of a dog 28, and establishing the positions of the flite FL, command generator 44E no longer needs to monitor signals provided by dog sensor 56F. Command generator 44E can compute the positions of the subsequent flites FL by counting the pulses to drive motor 52F since each pulse corresponds to a known incremental amount of movement of conveyor 12E.

Drive subsystems 32D and 32C function independently from one another and from drive system 32E, but in a manner identical to that of drive system 32E and described above. The combined effect of the operation of drive systems 32C–32E is to accurately position products 14A–14C within each flite FL. This operation is efficiently performed at high speeds by limiting the amount of velocity correction on each of the drive motors 52D–52E. The condition flag states from command generators 44C–44E can also be used by system processor 30 to optimize the velocity Vw of wrapper conveyor 12F with respect to the rate at which products 14A–14E are being received.

Another embodiment of drive control system 26 can be described with reference to FIG. 9. In this embodiment positioning drive subsystem 32E includes a command generator 132 which comprises a microprocessor 134, register 46E, BRM 48E and divider 50E. Command generator 132 generates drive command signals which are provided to the servo translator and amplifier system of drive motor 52E. The drive command signals contain information causing motor 52E to drive conveyor 12E a specific command distance at a predetermined command velocity. Information representative of the command distance and velocity are generated by microprocessor 134, and are represented by a velocity clock value loaded into register 46E. Register 46E, BRM 48E and divider 50E function in a manner described above.

Microprocessor 134 also stores data representative of the command distance and velocities in its associated RAM. Command generator 132 does not, therefore, require feedback from position encoder 54E to derive this information. In this embodiment position encoder 54E is used only by the servo translator and amplifier system (not shown) which controls drive motor 52E. Drive subsystems 32A–32D can also include command generators equivalent to 132 and function in the manner previously described.

Figure 9:
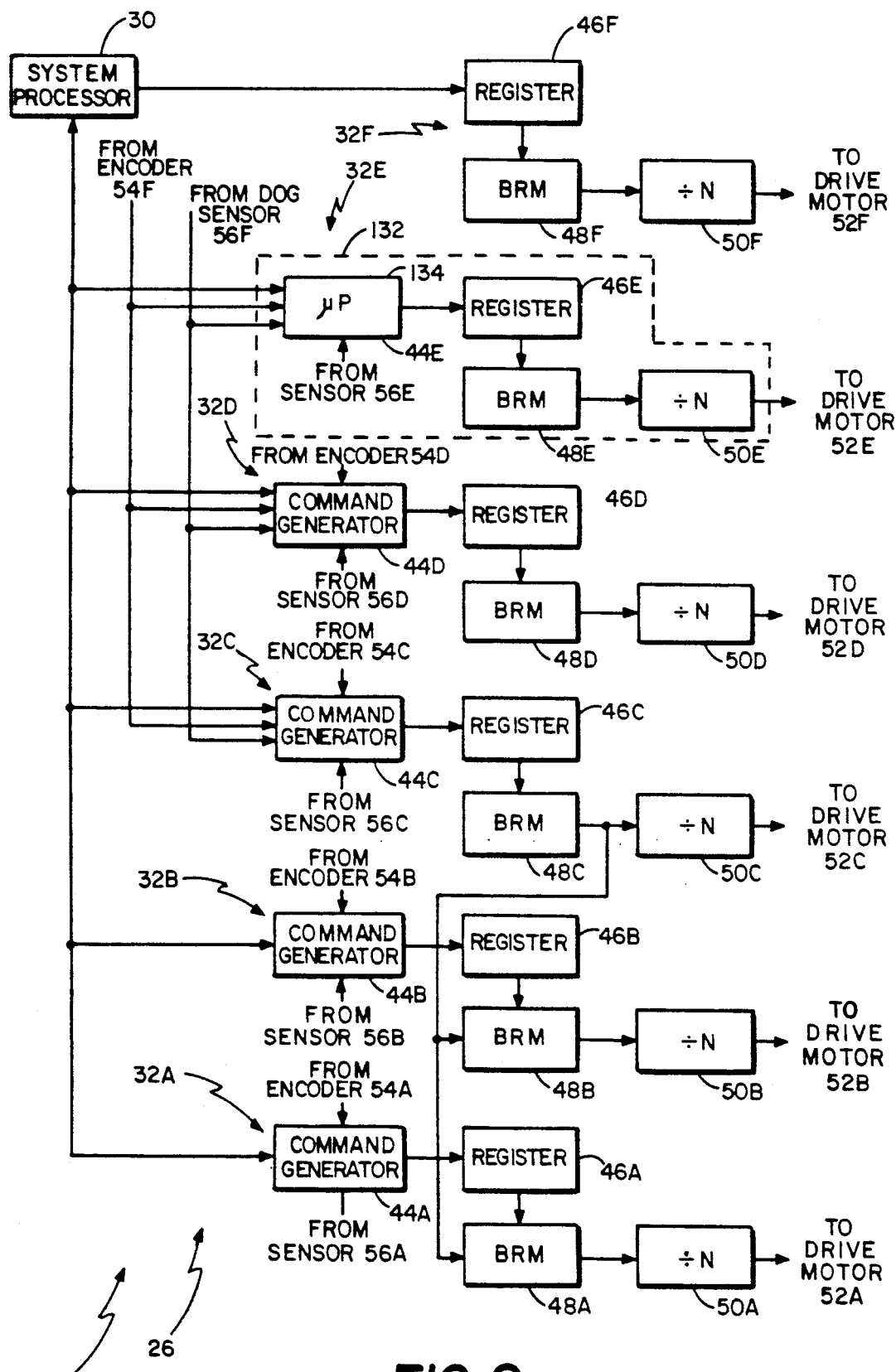
FIG. 9 is an illustration of portions of an alternative drive control system which is functionally identical to that shown in FIG. 2.

In the embodiment shown in FIG. 9, drive subsystems 32C–32E use signals from wrapper position encoder 54F to determine the velocity of wrapper conveyor 12F. Signals from BRM 48F are not, therefore, coupled to BRMs 48C–48E. This embodiment is functionally equivalent to that described above.

Product Spacing Drive Subsystems 32A–32B

Product spacing drive subsystems 32A and 32B monitor the positions of products 14A–14E on their respective conveyors 12A–12B, and control the velocity of the conveyors in such a manner as to attempt to position the products at effective conveyor lengths X with respect to one another. By "pre-spacing" the products in this manner, product positioning drive subsystems 32C–32E will prevent product contact (breakage and sticking) and allow the feeder to transport the product to all flites FL of wrapper conveyor 12F, increasing the overall performance of feeder system 10.

As shown in FIG. 2, command generators 44A and 44B are both connected to receive data and control signals from system processor 30, position encoder signals from their respective position encoders 54A and 54B, and sensor signals representative of products sensed by their respective sensors 56A and 56B. Product spacing drive subsystems 32A and 32B function in an identical manner. The following description of drive subsystem 32B is therefore representative of that of drive subsystem 32A as well.

Product spacing drive subsystem 32D controllably varies the velocity of conveyor 12B in such a manner as to attempt to space products 14A–14E at conveyor lengths X with respect to one another when they are transferred to subsequent conveyor 12C. BRM 48B of drive subsystem 32B has an input connected to receive the train of pulses produced by BRM 48C of product positioning drive subsystem 32C. The velocity of conveyor 12B can therefore be synchronized with the velocity of conveyor 12C. BRM 48B is also connected to receive signals representative of velocity clock values VCLK loaded into register 46B by command generator 44B. In response to ratio one velocity clock values VCLK1, BRM 48B will generate a train of pulses having the same frequency as that produced by BRM 48C, and drive conveyor 12B at the same velocity as conveyor 12C.

Figure 6:
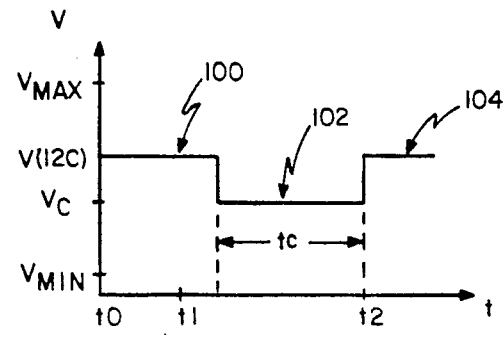
FIG. 6 is a graphical illustration of a spacing error correcting velocity profile implemented by a spacing drive subsystem of the control system shown in FIG. 1.

Spacing errors SE between products such as 14A–14E are corrected by two-segmented velocity profile switching techniques similar to those described above with reference to positioning drive subsystems 32C–32E. As shown in FIG. 6, conveyor 12B will be moving at a velocity established by second segment 100 at a previous velocity profile prior to time t1 at which a product such as 14A (its leading edge) is detected by sensor 56B. The velocity at which conveyor 12B is moving at this time is typically equal to the velocity of conveyor 12C. After calculating spacing error SE a the manner described below, command generator 44B generates a velocity clock value VCLK representative of first segment 102 of the error correcting velocity profile. During first segment 102, the velocity of conveyor 12B is switched to correction velocity Vc for a correction time tc. At time t2 the product 14A is transferred to subsequent conveyor 12C, and a velocity clock value VCLK representative of second segment 104 is loaded into register 46B. The velocity of conveyor 12B established by second segment 104 will again typically be equal to the velocity of conveyor 12C. Product 14A is thereby spaced at effective conveyor lengths X with respect to a preceeding product on conveyor 12C.

The sequence of steps executed by command generator 44B to correct spacing errors SE is determined as a function of the current values of a set of state flags in accordance with a state transition table. A description of state flags INITF, ENABLE, CALCF, MOVEF, FASTF and BUFFER used for this purpose is found in Table 5 below. Data characteristic of the current states of these flags is stored in RAM (not shown) associated with command generator 44B. The state transition table characterizing the sequence of steps followed by command generator 44B is illustrated in Table 5 below. A program characteristic of the state transition table illustrated in Table 5 is also stored in RAM or ROM of command generator 44B.

TABLE 5

| FLAG | STATE | SPACING ERROR SE STATE FLAG TABLE CONDITION |
|---|---|---|
| INITF | 0 | NO PRODUCTS ON CONVEYOR 12B BETWEEN SENSOR 56B AND CONVEYOR 12C |
| | 1 | AT LEAST ONE PRODUCT ON CONVEYOR 12B BETWEEN SENSOR 56B AND CONVEYOR 12C |
| ENABLF | 0 | NO VELOCITY CHANGE ALLOWED |
| | 1 | VELOCITY CHANGE ALLOWED |
| CALCF | 0 | NO CALCULATIONS TO BE MADE |
| | 1 | ONE CALCULATION TO BE MADE |
| | 2 | TWO CALCULATIONS TO BE MADE |
| MOVEF | 0 | NO SPACING ERROR CORRECTION PRODUCT MOVE |
| | 1 | START SPACING ERROR CORRECTION PRODUCT MOVE |
| | 2 | STOP SPACING ERROR CORRECTION PRODUCT MOVE |
| FASTF | 0 | NO FAST PROFILE |
| | 1 | MOVING AT FAST PROFILE |
| | 2 | ENABLE FAST PROFILE |
| BUFFER | N | NUMBER OF PRODUCTS ON CONVEYOR 12B BETWEEN SENSOR 56B and CONVEYOR 12C |

Initialize flag INITF can be in either a zero or one state. Command generator 44D sets initialize flag INITF equal to zero when the command generator is enabled to run independently upon initialization. When this action occurs no products such as 14A–14E are on conveyor 12B between product sensor 56B and the point at which they are transferred to conveyor 12C. Initialize flag INITF is set equal to one when a first product such as 14A is detected after the command generator is initialized.

Enable flag ENABLF is used by command generator 44B to enable and disable spacing error correction velocity profile changes. When conditions are appropriate for a spacing error correcting velocity profile change, command generator 44D sets enable flag ENABLF equal to one. If an error correcting velocity profile cannot be implemented, enable flag ENABLF is set equal to zero.

Buffer flag BUFFER is always updated by command generator 44B to indicate the current number N for products such as 14A–14E between product sensor 56B and the point at which they are transferred to conveyor 12C. Buffer flag BUFFER is incremented each time another product such as 14A–14E is sensed by product sensor 56B, and decremented each time a product is transferred to conveyor 12C. In an embodiment described below, product spacing subsystem 32B is configured to handle from zero to four products such as 14A–14D between product sensor 56B and conveyor 12C.

Calculate flag CALCF is used by command generator 44B to enable and disable calculations of spacing errors SE, and to indicate the number of calculations which must be made. Command generator 44B sets calculate flag CALCF equal to zero when no calculations need to be made. Calculations are not made until the spacing error correction velocity profile corresponding to the previously computed spacing error SE has been implemented. Calculate flag CALF is therefore set equal to one when a calculation must be made following the completion of a previously computed spacing error correcting velocity profile. When three or more products such as 14A–14C are on conveyor 12B between sensor 56B and conveyor 12C, at least two calculations will be required to correct for any spacing errors SE between these products. Under these conditions command generator 44B sets calculate flag CALF equal to two.

Move flag MOVEF is used by command generator 44B to control the implementation of spacing error correcting velocity profiles. Under conditions during which no spacing error correcting velocity profiles are to be implemented, move flag MOVEF is set equal to zero. Move flag MOVEF is set equal to one by command generator 44E when it is desired to implement a spacing error correcting velocity profile. Move flag MOVEF is set equal to two to terminate the implementation of a spacing error correcting velocity profile.

It occasionally happens that a product such as 14A will be transferred from conveyor 12B to 12C before a next or subsequent product such as 14B is detected by product sensor 56B. Under these conditions, the spacing error SE between products 14A and 14B is so great that it cannot be corrected and reduced to flite length L. Conveyor 12B is commanded to move at its maximum velocity Vmax under these conditions in an attempt to correct for spacing errors SE. Fast flag FASTF is used to control the operation of command generator 44B under these conditions. Fast flag FASTF is set equal to zero when conditions do not require conveyor 12B to be driven at its fast velocity profile. Command generator 44B sets fast flag FASTF equal to one when a fast velocity profile is being implemented, and sets the fast flag equal to two when a fast velocity profile is enabled, but not yet implemented.

To permit real-time calculations of spacing errors SE and the associated velocity clock values VCLK, a variety of required parameters are precalculated by system processor 30 and downloaded to command generator 44B upon initialization of the operation of spacing error drive subsystem 32B in its operating mode. These precalculated parameters include maximum wrapper velocity Vwm, positive and negative error command distances Dc+ and Dc−, maximum and minimum correction velocities Vmax and Vmin, maximum and minimum correction times tc+ and tc−, maximum and minimum spacing errors which can be corrected for by drive subsystem 32B, Dmax and Dmin, and velocity clock value VCLK1 required to drive conveyor 12B at a one-to-one ratio with respect to conveyor 12C. With the exception of command distances Dc+ and Dc−, all of the parameters identified immediately above are calculated in a manner identical to their counterparts described above with reference to product positioning drive subsystem 32A. It must be understood, however, that the values of the parameters used for these calculations may differ for spacing drive subsystem 32B since the operational characteristics of the subsystem can differ from that of product positioning drive subsystem 32A.

The equations used by system processor 30 to calculate positive and negative error command distances Dc+ and Dc− for synchronization drive subsystem 32B are given below in Equations 17 and 18.

$$Dc+ = \text{Distance from sensor 56}B \text{ to the leading edge of conveyor 12}B \quad \text{Eq. 17}$$

$$DC- = 1.5 \times \text{length of products 14}A\text{-14}E \quad \text{Eq. 18}$$

Spacing drive subsystem 12B operates on the assumption that products 14A-14E are transferred to conveyor 12C when their center of gravity is positioned on conveyor 12C. Assuming the mass distribution of products 14A-14E is consistent, the center of gravity is taken as the center of the product along its length in the direction of travel. In other words, products 14A-14E are assumed to have been fully transferred to conveyor 12C when they are halfway on to the conveyor. Transfer distance Dtr, the distance that products 14A-14E must be driven on conveyor 12B before they are transferred to conveyor 12C, is also precalculated by system processor 30 and down-loaded to command generator 44B. Transfer distance Dtr is set equal to the sum of the distance between sensor 56B and the leading edge of conveyor 12B, and half the length of a product such as 14A.

Command generator 44B monitors and stores data characteristic of spacing errors SE between products 14A-14E on conveyor 12B and between sensor 56B and the conveyor's leading edge. The spacing errors SE are determined as a function of signals received from position encoder 54B. Variable ENCPOS, POS0, POS1 and POS2 which are described below in Table 6 are used for this purpose.

TABLE 6

| | |
|---|---|
| ENCPOS | CONVEYOR POSITION WHEN PRODUCT IS DETECTED |
| POS0 | DISTANCE BETWEEN FIRST AND SECOND DETECTED PRODUCTS ON CONVEYOR |
| POS1 | DISTANCE BETWEEN SECOND AND THIRD DETECTED PRODUCTS ON CONVEYOR |
| POS2 | DISTANCE BETWEEN THIRD AND FOURTH DETECTED PRODUCTS ON CONVEYOR |

Encoder position variable ENCPOS is reset to zero by command generator 44B each time one of products 14A-14E is detected by product sensor 56B. Encoder position variable ENCPOS is then updated as a function of the signals received from position encoder 54B until a next subsequent product 14A-14E is detected. Alternatively, encoder position variable ENCPOS can be updated by the command generator itself as a function of the drive signals. The value of encoder position variable ENCPOS is therefore representative of the distance that a most recently detected product 14A-14E has been moved by conveyor 12B. After each new product has been detected, and before it is reset, encoder position variable ENCPOS is representative of the spacing or distance between sequential products 14A-14E. This data is transferred to position variables POS0, POS1, and POS2. Values of position variables POS0, POS1, and POS2 are shifted so variable POS0 is representative of the spacing between a first product such as 14A and a second product such as 14B which happen to be between product sensor 56B and the leading edge of conveyor 12B. Variable POS1 is representative of the distance between the second product such as 14B and a third product such as 14C which happen to be on conveyor 12B between its leading edge and product sensor 56B. Similarly, position variable POS2 is representative of the distance between third product 14C and a fourth product such as 14D which may happen to be between product sensor 56B and the leading edge of conveyor 12B. The values of position variables POS0, POS1 and POS2 are shifted each time another product is transferred to conveyor 12C, or detected by sensor 56B.

The calculations made by command generator 44B to determine spacing errors SE between products are always made with respect to the two products on conveyor 12B closest to its leading edge (i.e. products 14A and 14B before product 14A is transferred to conveyor 12C, and products 14B and 14C after product 14A has been transferred to conveyor 12C). Spacing errors SE are determined as a function of the difference between effective conveyor length X and position variable POS0. This relation is described below in Equation 19.

$$SE = X - POS0 \qquad \text{eq. 19}$$

Figure 7:
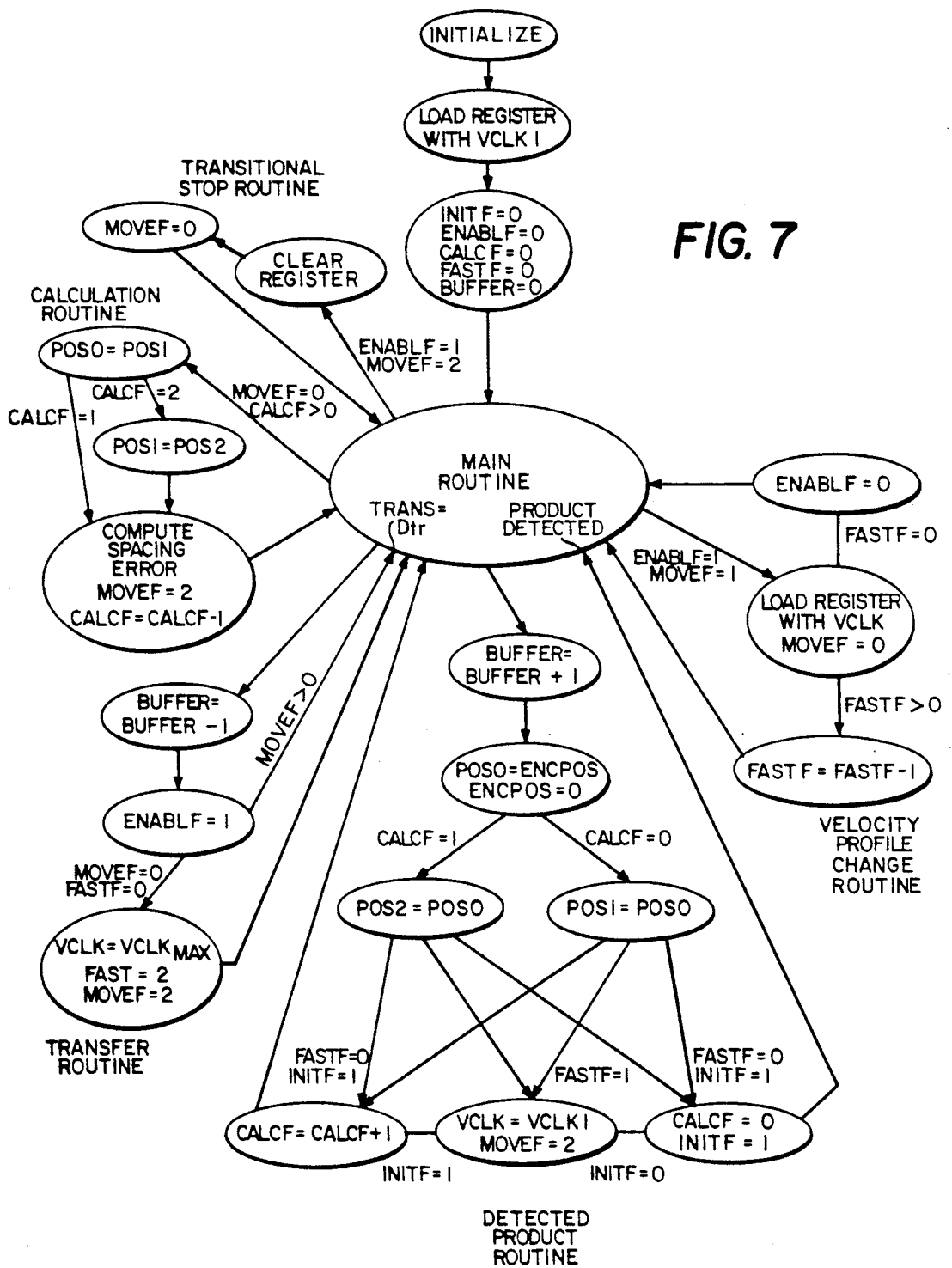
FIG. 7 is a state diagram describing the operation of the spacing drive subsystems as a function of the value of state flags characteristic of the configuration of products on conveyors.

The overall operation of spacing drive subsystem 32B can be best described with reference to FIGS. 7 and 8. FIG. 7 is a state transition transition diagram which illustrates the various sequences of operations performed by command generator 44B and other elements of drive subsystem 32B. In the course of cycling through the step illustrated in FIG. 7, the relative spacing and positional configurations of products 14A-14E on conveyor 12B can be characterized by one of ten possible Stable Subsystem States 1-10. The values of state flags INITF, ENABLF, MOVEF, CALCF, FASTF and BUFFER in each of the Subsystem States, as well as the corresponding configurations of products 14A-14E, are illustrated in FIG. 8. For purposes of example, the sequence of Subsystem States 1-10 in FIG. 8 are illustrated in conjunction with continuous motion of conveyors 12A and 12B.

As shown in FIG. 7, the operation of spacing drive subsystem 32B begins with the initialization of command generator 44B. During initialization the various precalculated system parameters described above are down-loaded into command generator 44B from system processor 30. Velocity clock value VCLK is then loaded into register 46B to cause conveyor 12B to be driven at a one-to-one velocity ratio with respect to the velocity of conveyor 12C. Prior to entering its Main Routine, command generator 44B also sets all state flags INITF, ENABLF, CALCF, FASTF and BUFFER equal to zero.

Once it is in its Main Routine, command generator 44B monitors signals from product sensor 56B which indicates a change in the configuration of products 14A-14E. Following the example shown in FIG. 8, there are initially no products 14A-14E between product sensor 56B and the transfer point to conveyor 12C (i.e. within distance Dtr from sensor 56B). This product configuration corresponds to Subsystem State 1, during which all of the state flags are equal to zero.

With the continued motion of conveyor 12B, product 14A will be detected by sensor 56B. Each time a product 14A-14E is detected by sensor 56B, command generator 44B enters its Detected Product Routine.

As shown in FIG. 7, command generator 44B first increments buffer flag BUFFER by one to indicate that there is now one product 14A between sensor 56B and the transfer point to conveyor 12C. Position variable POS0 is set equal to the current value of variable ENCPOS (although this is of no significance at this point), and variable ENCPOS reset to zero.

Under the product configuration associated with State 2 illustrated in FIG. 8, flags CALCF, FASTF and INITF are currently equal to zero since product 14A is the first product detected between product sensor 56B and the transfer point to conveyor 12C. Accordingly, the value of position variable POS1 is set equal to that of position variable POS0 and initialize flag INITF is set equal to one before command generator 44B returns to its Main Routine. As shown in FIG. 8, initialize flag INITF and buffer flag BUFFER are equal to one, while remaining flags ENABLF, MOVEF and CALCF, and FASTF are still equal to zero following the configuration of products corresponding to Subsystem State 2.

As the motion of conveyor 12B continues, command generator 44B remains in its Main Routine and the values of the state flags are unchanged until a next or subsequent product such as 14B is detected by sensor 56B. This product configuration corresponds to State 3.

Since another product 14B has been detected, command generator 44B again enters its Detected Product Routine and increments buffer flag BUFFER. Buffer flag BUFFER is thereby set equal to two, indicating the presence of two products 14A and 14B between sensor 56B and the transfer point to conveyor 12C.

Position variable POS0 is then set equal to the current value of encoder position ENCPOS, and ENCPOS subsequently reset to zero. The value of position variable POS0 is therefore representative of the spacing or distance between products 14A and 14B.

Calculate flag CALCF is still equal to zero at this point, so position variable POS1 is set equal to the current value of position variable POS0. Initialize flag INITF is equal to one, and fast flag FASTF is equal to zero. Calculate flag CALCF is therefore updated by adding one to the current value (zero), and set equal to one. Command generator 44B then returns to its Main Routine.

Under the above-described current conditions of the state flags, move flag MOVEF is equal to zero while calculate flag CALCF is equal to one (i.e. greater than zero). Command generator 44B therefore enters its Calculation Routine. Upon so doing, the value of position variable POS0 is set equal to the current value of position variable POS1, and therefore represents the spacing between products 14A and 14B. Calculate flag CALCF is equal to one at this point. Command generator 44B will therefore compute spacing error SE in accordance with Equation 19 described above, as well as the appropriate velocity clock value VCLK required to implement a spacing error correction velocity profile. The value of move flag MOVEF is updated and set equal to two, while calculate flag CALCF is decremented by one since a calculation has just been completed. Command generator 44B then returns to its Main Routine. Following the execution of the Detected Product and Calculation Routines for the product conditions associated with State 3, enable flag ENABLF, calculate flag CALCF, and fast flag FASTF will be equal to zero. Initialize flag INITF will be equal to one. Move flag MOVEF and buffer flag BUFFER will both be equal to two.

As the motion of conveyor 12B continues with the example shown in FIG. 8, product 14C will be detected by sensor 56B before product 14A is transferred to conveyor 12C. This configuration of products is described by State 4. Since another product 14C is detected, command generator 44 again enters its Detected Product Routine. Buffer flag BUFFER is again incremented, and the value of position variable POS0 is set equal to the current value of encoder variable ENCPOS. Since calculate flag CALCF was decremented and set to zero during the previous execution of the Calculation Routine, the value of position variable POS1 is set equal to the current value of position variable POS0. Fast flag FASTF is still equal to zero, while initialize flag INITF is still equal to one. Calculate flag CALCF is therefore incremented and set equal to one before command generator 44B returns to its Main Routine. Following the execution of the Detected Product Routine for the product configuration associated with State 4, enable flag ENABLF and fast flag FASTF are equal to zero, initialize flag INITF and calculation flag CALCF are equal to one, move flag MOVEF equal to two, and buffer flag BUFFER is equal to three.

In the embodiment described, command generator 44B will not compute a spacing error SE and associated error correction velocity clock value VCLK if an error correcting velocity profile using a previously calculated velocity clock value has not yet been executed. Following the conditions of State 4 above, the error correcting velocity profile required to correct the spacing error between products 14A and 14B has not yet been executed since product 14A is still on conveyor 12B (move flag MOVEF is equal to two). Command generator 44B will not, therefore, enter its Calculation Routine to compute the spacing error SE between products 14B and 14C, even though the necessary information has been obtained.

Continuing with the example shown in FIG. 8, further motion of conveyor 12B results in product 14D being detected by product sensor 56B before product 14A reaches the transfer point between conveyors 12B and 12C. Command generator 44B therefore enters and executes the sequence of steps in its Detected Product Routine. Buffer flag BUFFER is incremented and set equal to four indicating that four products 14A-14D are on conveyor 12B between sensor 56B and the transfer point to conveyor 12C. The value of position variable POS0 is set equal to the current value of encoder position variable ENCPOS, and variable ENCPOS reset to zero. Since fast flag FASTF and initialize flag INITF are still in their zero and one states, respectively, calculate flag CALCF is incremented and set equal to 2 before command generator 44B returns to its Main Routine. After this action resulting from the configuration of products associated with Subsystem State 5, enable flag ENABLF and fast flag FASTF are equal to zero, initialize flag INITF is equal to one, move flag MOVEF and calculate flag CALCF are equal to two, and buffer flag BUFFER is equal to four.

While the above-described actions are taking place, command generator 44B constantly monitors the position of product 14A with respect to product sensor 56B to determine whether it has been transferred to conveyor 12C. This position (variable TRANS) is determined by summing the current values of position variables POS0, POS1, POS2, and encoder position variable ENCPOS in accordance with Equation 20 below.

$$TRANS = POS0 + POS1 + POS2 + ENCPOS \quad Eq.20$$

Variable TRANS is therefore always representative of the distance of the product closest to conveyor 12C from sensor 56B. Whenever the value of variable TRANS is equal to transfer distance Dtr, command generator 44B recognizes the fact that a product has been transferred to such conveyor 12C. Following the example illustrated in FIG. 8, motion of conveyor 12B has placed product 14A onto conveyor 12C. Command generator 44B recognizes this event since variable TRANS will equal transfer distance Dtr. This product configuration corresponds to State 6 in FIG. 8. Under these conditions, command generator 44B enters its Transfer Routine.

Buffer flag BUFFER is decremented by one and set equal to three since product 14A has been transferred to conveyor 12C. Enable flag ENABLF is then set equal to one to enable the implementation of a spacing error correction velocity profile. Move flag MOVEF is currently equal to two (i.e. greater than zero) so command generator 44 will then return to its Main Routine.

With enable flag ENABLF equal to one and move flag MOVEF equal to two, conditions are appropriate for the implementation of a velocity profile to correct spacing error SE between products 14A and 14B. Command generator 44B therefore enters its Transitional Routine, during which it clears register 46B and sets move flag MOVEF equal to one before returning to the Main Routine.

Having returned to its Main Routine from its Transitional Stop Routine, command generator 44 has its enable flag ENABLF and move flag MOVEF both set equal to one. Command generator 44B will therefore immediately enter its Velocity Profile Change Routine. The velocity clock value VCLK which was previously calculated and stored in a buffer is loaded into register 46B. Conveyor 12B is then driven at a velocity profile which will correct for the spacing error SE between products 14A and 14B. In the meantime, move flag MOVEF and enable flag ENABLF are set equal to zero before command generator 44B returns to its Main Routine.

Since move flag MOVEF is equal to zero while calculate flag CALCF is equal to two at this point, command generator 44B will reenter its Calculation Routine and compute the spacing error SE and associated velocity clock value VCLK required to correct any spacing error between products 14B and 14C. The value of position variable POS1 is transferred into position variable POS0. Since at this time two spacing error corrections need yet be made, and calculate flag CALCF is equal to two, the value of position variable POS2 characteristic of the spacing between products 14C and 14D is transferred into position variable POS1. Spacing error SE and its associated velocity clock value VCLK are then computed. After move flag MOVEF is set equal to two and the calculate flag CALCF is decremented by one and set equal to one, command generator 44B returns to its Main Routine. Following execution of the above-described sequence of operations for the product configuration associated with State 6, enable flag ENABLF and fast flag FASTF will be equal to zero, initialize flag INITF and calculate flag CALCF will be equal to one, move flag MOVEF will be equal to two, and buffer flag BUFFER will be equal to three.

The transfer of product 14B to conveyor 12C following continued motion of conveyor 12B will be recognized by command generator 44B when transfer value TRANS becomes equal to transfer distance Dtr. Command generator 44B will then leave its Main Routine and enter its Transfer Routine. Buffer flag BUFFER is decremented by one and set equal to two. Command generator 44B will then execute, in sequence, its Transfer, Transitional Step, Velocity Profile Change and Calculation Routines in a manner similar to that described above. In so doing, a velocity profile which corrects the spacing ereror SE between products 14B and 14C is executed, and the spacing error SE between products 14C and 14D as well as the associated velocity clock value VCLK are computed. Following this sequence of operations, which are associated with the product configuration of State 7, enable flag ENABLF, calculates flag CALCF, and fast flag FASTF will all be equal to zero. Initialize flag INITF will be equal to one, while move flag MOVEF and buffer flag BUFFER will be equal to two.

Continued motion of conveyor 12B will result in the transfer of product 14C to conveyor 12C. This event will be recognized by command generator 44B when transfer count variable TRANS equals transfer distance Dtr. This action is illustrated in State 8 in FIG. 8. Command generator 44B will enter its Transfer Routine during which buffer flag BUFFER is decremented and set equal to one, and enable flag ENABLF is set equal to one. Move flag MOVEF is still equal to two, so command generator 44B will then return to its Main Routine and immediately enter its Transitional Stop Routine. Register 46B is cleared, and move flag MOVEF is set equal to one. After returning to the Main Routine from the Transitional Stop Routine, command generator 44B will immediately enter its Velocity Profile Change Routine since enable flag ENABLF and move flag MOVEF are equal to one. Register 46B will be loaded with the previously computed velocity clock value VCLK, and move flag MOVEF set to zero. Conveyor 12B is thereby driven at a velocity profile which will correct for spacing errors between products 14C and 14D. Since fast flag FASTF is still equal to zero, enable flag ENABLF is set equal to zero and command generator 44B returns to its Main Routine. Following the completion of the sequence of steps associated with the product configuration of State 8, enable flag ENABLF, move flag MOVEF, calculate flag CALCF, and fast flag FASTF will be equal to zero. Initialize flag INITF and buffer flag BUFER will be equal to one.

As the motion of conveyor 12B continues, product 14D will be transferred to conveyor 12C. This event will be recognized by command generator 44B when transfer count variable TRANS equals the value of transfer distance Dtr. This product configuration is associated with State 9 in FIG. 8. As shown, there are no products on conveyor 12B between product sensor 56D and the transfer point to conveyor 12C in this configuration. Product 14E is, however, approaching sensor 56B.

Since the transfer of product 14D is recognized, command generator 44B will enter its Transfer Detected Routine. Buffer flag BUFFER will be decremented by one and set equal to zero, while enable flag ENABLF will be set equal to one. At this point both move flag MOVEF and fast flag FASTF will be equal to zero since no spacing error correcting velocity profiles remain calculated but unexecuted. Velocity clock value VCKLm representative of the maximum velocity Vmax of conveyor 12B is then loaded into buffer memory of command generator 44B. Fast flag FASTF and move flag MOVEF are both set equal to two, and command generator 44B returns to its Main Routine.

Since enable flag ENABLF is equal to one and move flag MOVEF is equal to two at this point, command generator 44B will enter its Transitional Stop Routine. Register 46B will be cleared, and move flag MOVEF set equal to one before command generator 44B returns to its Main Routine. The Velocity Profile Change Routine will then be entered. Registered 46B is loaded with velocity clock value VCLKm, and move flag MOVEF set equal to zero. Since fast flag FASTF is equal to two at this point it is decremented by one and set equal to one before command generator 44B returns to its Main Routine.

Following the completion of a sequence of steps associated with the product configuration of State 9, conveyor 12B is being driven at its maximum velocity Vmax in an attempt to decrease the large distance which exits between products 14D and 14E. Move flag MOVEF, calculate flag CALCF, and buffer flag BUFFER will all be equal to zero. Initialize flag INITF, enable flag ENABLF and fast flag FASTF will all be equal to one.

Following continued motion of conveyor 12B sensor 56B will detect product 14E. This product configuration is associated with State 10 in FIG. 8. Upon entering its Detected Product Routine command generator 44B will increment buffer flag BUFFER by one. The current value of encoder position variable ENCPOS is stored in position variable POS0, and variable ENCPOS reset to zero. Since calculate flag CALCF is equal to zero at this point, the value of position variable POS0 is transferred to position variable POS1. Fast flag FASTF is equal to one. Spacing drive subsystem 32B makes all calculations required to correct for spacing errors SE between product 14E and subsequent products while conveyor 12B is running at a one-to-one velocity ratio with respect to a conveyor 12C. Velocity clock value VCLK1 is therefore loaded into buffer memory of command generator 44B, and move flag MOVEF is set equal to two. Initialize flag INITF is equal to one at this time, so calculate flag CALCF is incremented by one (i.e. set equal to one) before command generator 44B returns to its Main Routine.

Since enable flag ENABLF is equal to one and move flag MOVEF is equal to two, command generator 44B will immediately enter its Transitional Stop Routine, clear register 46B and set move flag MOVEF equal to one. Upon entering the Velocity Profile Change Routine after returning to the Main Routine, register 44B is loaded with velocity clock value VCLK1 and move flag MOVEF is set equal to zero. Conveyor 12B will then be driven at a one-to-one velocity ratio with respect to conveyor 12C. Since fast flag FASTF is equal to one, it is decremented by one and set equal to zero before command generator 44B returns to its Main Routine.

Following the above-described sequence of steps, calculate flag CALFC will be equal to one and move flag equal to zero. Command generator 44B will therefore enter its Calculation Routine to determine the spacing error SE between products 14D and 14E. The value of position variable POS0 is set equal to that of variable POS1 before spacing error SE and associated velocity clock value VCLK are computed. Move flag MOVEF is then set equal to two and calculate flag CALCF decremented by one and set equal to zero before command generator 44B enters its Transitional Stop Routine. Register 44B is cleared and move flag MOVEF set equal to one. The spacing error SE is then corrected when command generator 44B enters its Velocity Profile Change Routine. Register 46B is loaded with the previously computed velocity clock value VCLK to initiate the spacing error SE correcting velocity profile, and move flag MOVEF set to zero. Enable flag ENABLF is then set to zero before command generator 44B returns to its Main Routine. Flags ENABLF, MOVEF, CALCF and FASTF will all be equal to zero and flags INITF and BUFFER equal to one following the above-described procedures necessitated by the product configuration and associated with State 10.

Spacing drive subsystem 32A can operate in a manner identical to that described above. The values of state flag INITF, ENABLF, CALCF, MOVEF, FASTF and/or BUFFER can be used in conjunction with the condition flags of positioning drive subsystems 32C–32E to optimize the velocity Vw of wrapper conveyor 12F.

Conclusion

It is evident that the combined effect of spacing drive subsystems 32A and 32B is to space products 14A-14E effective conveyor lengths X (e.g. flite lengths L) with respect to one another. Positioning drive subsystems 32C-32E then cooperate to position one of products 14A-14E at the desired location within most if not all flites FL. Since all of these procedures of noncontacting feeder system 10 are performed in real time, the wrapper associated with feeder system can be efficiently operated.

Although the present invention has been described with reference to preferred embodiments, workers skilled in the art will recognize that changes may be made in form and detail without departing from the spirit and scope of the invention.

What is claimed is:

1. A conveyor system including:
   a downstream conveyor having a plurality of spaced product receiving flites;
   a downstream conveyor drive;
   a downstream conveyor monitor for providing data representative of flite positions of the downstream conveyor;
   an upstream conveyor upstream from the downstream conveyor for receiving products and for driving the products toward the downstream conveyor;
   an upstream conveyor drive responsive to drive control signals;
   an upstream conveyor monitor for providing data representative of product positions on the upstream conveyor; and
   a product positioning drive control system coupled to receive data from the downstream conveyor monitor and the upstream conveyor monitor, for controlling the upstream conveyor drive and causing products to be positioned within flites, including:
      means for computing positional errors of products on the upstream conveyor relative to target flites;
      means for storing data representative of fill states of target flites, including data representative of whether the target flites are full;
      means for generating upstream conveyor drive control signals as a function of the positional errors of products and the fill states of the target flites, so as to attempt to cause relative alignment between the products and associated target flites or flites adjacent the target flites; and
      means for updating the stored data representative of the fill states of the target flites as a function of the flites in which products are positioned.

2. The conveyor system of claim 1 wherein the product positioning drive control system further includes:
   means for storing data representative of the fill states of target flites and flites previous to the target flites, including data representative of whether the target flites are full and whether the flites previous to the target flites are full;
   means for generating upstream conveyor drive control signals as a function of the positional errors of products and the fill states of the target flites and the flites previous to the target flites; and
   means for updating the stored data representative of the fill states of the target flites and the flites previous to the target flites as a function of the flites in which products are positioned.

3. The conveyor system of claim 2 wherein the product positioning drive control system includes:
   means for characterizing the positional errors of products on the upstream conveyor relative to the target flites as being in one of at least two positive and at least two negative discrete positional error states wherein each of the error states represents a range of positional errors; and
   means for generating upstream conveyor drive control signals as a function of the positional error states and the fill states of the target flites and flites previous to the target flites.

4. The conveyor system of claim 3 wherein the product positioning drive control system further includes:
   means for characterizing the positional errors of the products as being in one of a first positional error state during which the error is between zero and a first positive error value, a second positional error state during which the error is greater than the first positive error value, a third positional error state during which the error is between zero and a first negative error value, and a fourth positional error state during which the error is less than the first negative error value.

5. The conveyor system of claim 2 wherein the means for storing data includes means for storing data characterizing the fill states of the target flites and flites previous to the target flites as being in one of a first fill state during which the previous flite and target flite are empty, a second fill state during which the previous flite is full and the target flite is empty, and a third fill state during which the target flite and previous flite are full.

6. The conveyor system of claim 2 wherein the product positioning drive control system further includes:
   means for receiving data representative of a velocity of the downstream conveyor; and
   means for generating upstream conveyor drive control signals causing velocity of the upstream conveyor to switch to a first segment position correcting velocity determined as a function of a positional error of a product and the fill state of the associated target flite and flite previous to the target flite, and to switch to a second segment velocity equal to the downstream conveyor velocity, after the product is detected and before it is transferred from the upstream conveyor.

7. A conveyor system including:
   a downstream conveyor having a plurality of spaced product receiving flites;
   a downstream conveyor drive;
   a downstream conveyor drive control for controlling the downstream conveyor drive and for providing signals representative of the velocity of the downstream conveyor;
   a downstream conveyor monitor for providing data representative of flite positions on the downstream conveyor;
   a first upstream conveyor upstream from the downstream conveyor for receiving products and for driving the products toward the downstream conveyor;
   a first upstream conveyor drive responsive to drive control signals;
   a first upstream conveyor monitor for providing data representative of product positions on the upstream conveyor; and a first upstream conveyor product positioning drive control system coupled to the downstream conveyor drive control, the downstream conveyor monitor, and to the upstream conveyor monitor, for controlling the first upstream conveyor drive so as to shift positions of products on the first upstream conveyor relative to flites on the downstream conveyor, including:

means for computing positional errors of products on the upstream conveyor with respect to target flites;

means for characterizing the positional errors as being in one of a plurality of condition flag states, each condition flag state representing a range of positional errors, and including condition flag states representing at least two ranges of positive positional errors and at least two ranges of negative positional errors;

means for characterizing fill states of the target flites and flites previous to the target flites as being in one of a plurality of full flag states, including full flag states representative of whether the target flites are full and whether the flites previous to the target flites are full;

means for characterizing position correction distances between the positions of products on the first upstream conveyor and selected flites on the downstream conveyor as a function of full flag states and condition flag states;

means for generating upstream conveyor drive control signals for controlling the velocity of the upstream conveyor and causing positions of products on the first upstream conveyor to be shifted by the correction distances with respect to the downstream conveyor in an attempt to cause relative alignment between the products and associated target flites or flites adjacent the target flites; and means for updating the full flag states to reflect the fill states of the target and previous flites after the positions of products have been shifted.

8. The conveyor system of claim 7 wherein the downstream conveyor monitor includes a position encoder coupled to the downstream conveyor drive for providing data representative of positions and velocity of the downstream conveyor.

9. The conveyor system of claim 8 wherein:
the downstream conveyor includes dogs defining the flites; and
the downstream conveyor monitor includes a dog sensor for providing data representative of the positions of dogs.

10. The conveyor system of claim 7 wherein the upstream conveyor monitor includes:
a position encoder coupled to the first upstream conveyor drive for providing data representative of the position of the first upstream conveyor; and
a product sensor for providing data representative of the positions of products on the first upstream conveyor.

11. The conveyor system of claim 10 wherein the product sensor is positioned midway between leading and trailing edges of the first upstream conveyor.

12. The conveyor system of claim 7 wherein the means for characterizing positional errors includes:
means for storing a condition flag table of data representative of a plurality of condition flag states and associated ranges of positional errors; and means for accessing the condition flag table as a function of the positional errors to determine current condition flag states.

13. The conveyor system of claim 12 wherein the means for storing a condition flag table includes means for storing data characterizing the positional errors as being in one of a first positional error state during which the error is between zero and a first positive error value, a second positional error state during which the error is greater than or equal to the first positional error, a third positional error state during which the error is less than or equal to zero and greater than or equal to a first negative error value, and a fourth positional error state during which the positional error is less than the first negative error value.

14. The conveyor system of claim 7 wherein the means for characterizing position correction distances includes:
means for storing a correction distance table of data representing correction distances as a function of full flag states characterizing fill states of the target flites and flites previous to the target flites and condition flag states representing ranges of positional errors; and
means for accessing the correction distance table as a function of current full flag states and condition flag states to determine correction distances.

15. The conveyor system of claim 7 and further including:
a second upstream conveyor upstream from the first upstream conveyor for receiving products and for driving the products toward the first upstream conveyor;
a second upstream conveyor drive responsive to drive control signals;
a second upstream conveyor monitor for producing data representative of product positions on the second upstream conveyor; and
a second upstream conveyor product positioning drive control system coupled to the downstream conveyor drive control, the downstream conveyor monitor, and to the upstream conveyor monitor, for controlling the second upstream conveyor drive so as to shift positions of products on the second upstream conveyor relative to flites on the downstream conveyor, including:

means for computing positional errors of products on the second upstream conveyor with respect to target flites;

means for characterizing the positional errors as being in one of a plurality of condition flag states, each condition flag state representing a range of positional errors, and including condition flag states representing at least two ranges of positive positional errors and at least two ranges of negative positional errors;

means for characterizing fill states of the target flites and flites previous to the target flites as being in one of a plurality of full flag states, including full flag states representative of whether the target flites are full and whether the flites previous to the target flites are full;

means for characterizing position correction distances between the positions of products on the second upstream conveyor and selected flites on the downstream conveyor as a function of full flag states and condition flag states;

means for generating upstream conveyor drive control signals for controlling the velocity of the second upstream conveyor and causing positions of products on the second upstream conveyor to be shifted by the correction distances with respect to the downstream conveyor in an attempt to cause relative alignment between the products and associated target flites or flites adjacent the target flites; and means for updating the full flag states to relfect the fill states of the target and previous flites after the positions of products have been shifted.

16. A method for operating a drive control system for an upstream conveyor receiving potentially irregularly spaced products and positioned to drive products toward a receiving system having a plurality of regularly spaced product receiving flites, the method including for each product received:

detecting the product on the upstream conveyor;

determining a flite on the receiving system as a target flite for the product;

determining fill states of the target flite and an adjacent preceding flite;

determining positional errors of the product on the upstream conveyor relative to its target flite;

selecting a destination flite for the product from among the preceding flite, the target flite and an adjacent following flite as a function of the fill states of the target flite and the preceding flite, and the positional errors of the product relative to its target flite; and controlling the velocity profile of the product by varying the speed of the upstream conveyor with respect to velocity of the receiving system to deliver the product to its destination flite.

17. The method of claim 16 wherein:

determining positional errors of products includes characterizing the positional errors of products relative to the target flites as being in one of at least two positive and at least two negative discrete phase error states representing a range of positional errors; and varying the velocity of the upstream conveyor includes controlling the speed of the upstream conveyor as a function of the phase error states and the fill states of the target flites and the preceding flites to the target flites 18. The method of claim 16 wherein determining the fill states of the target and preceding flites includes characterizing the fill states as being in one of a first fill state during which less than the capacity for product is destined for or in the preceding flite and the target flite is empty, a second fill state during which the preceding flite is full and less than the capacity for product is destined for or in the target flite, and a third fill state during which the capacity for product is already destined for or in the target flite and the preceding flite.

19. A method for operating a drive control system for an upstream conveyor positioned to drive products toward a receiving system having a plurality of spaced product receiving flites, the method including:

determining a target flite for product as received upon the upstream conveyor;

determining phase errors of products on the upstream conveyor relative to their respective target flites;

characterizing the phase errors as being in one of plurality of condition flag states, each condition flag state representing a range of phase errors, and including condition flags representing as least two ranges of positive phase errors and at least two ranges of negative phase errors;

determining fill states of target flites and flites previous to the target flites, including whether the target flites are full and whether the flites previous to the target flites are full;

characterizing the fill states of target flites and flites previous to the target flites as being in one of a plurality of full flag states;

selecting destination flites for the products as a function of full flag states, the condition flag states and the phase errors;

characterizing position correction distances between positions of products on the upstream conveyor and their destination flites; and controlling velocity of the upstream conveyor to shift positions of products on the upstream conveyor by the correction distances with respect to the receiving system to position the products in their destination flites.

* * * * *

UNITED STATES PATENT AND TRADEMARK OFFICE
CERTIFICATE OF CORRECTION

PATENT NO. : 5,070,995

DATED : December 10, 1991

INVENTOR(S) : Eric J. Schaffer et al.

It is certified that error appears in the above-identified patent and that said Letters Patent is hereby corrected as shown below:

Col. 31, line 10, delete "relfect" and insert --reflect--.

Col. 32, line 2, after "flites" insert --.--.

Col. 32, line 24, delete "as" and insert --at--.

Signed and Sealed this

Thirtieth Day of March, 1993

Attest:

STEPHEN G. KUNIN

Attesting Officer

Acting Commissioner of Patents and Trademarks